(12) United States Patent
Isomura et al.

(10) Patent No.: US 9,682,700 B2
(45) Date of Patent: Jun. 20, 2017

(54) HYBRID SYSTEM CONTROL DEVICE

(75) Inventors: Haruo Isomura, Susono (JP); Hiroaki Ebuchi, Hadano (JP); Hiroyuki Shibata, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 103 days.

(21) Appl. No.: 14/383,390

(22) PCT Filed: Mar. 8, 2012

(86) PCT No.: PCT/JP2012/056034
§ 371 (c)(1),
(2), (4) Date: Sep. 5, 2014

(87) PCT Pub. No.: WO2013/132639
PCT Pub. Date: Sep. 12, 2013

(65) Prior Publication Data
US 2015/0031503 A1    Jan. 29, 2015

(51) Int. Cl.
*B60K 6/36* (2007.10)
*B60K 6/38* (2007.10)
(Continued)

(52) U.S. Cl.
CPC ............... *B60W 20/40* (2013.01); *B60K 6/36* (2013.01); *B60K 6/365* (2013.01); *B60K 6/38* (2013.01);
(Continued)

(58) Field of Classification Search
CPC ........................................................ B60K 6/38
See application file for complete search history.

(56) References Cited

U.S. PATENT DOCUMENTS 6,524,217 B1   2/2003  Murakami et al.
6,645,105 B2 * 11/2003  Kima ..................... B60K 6/365
                                                                475/5
(Continued)

FOREIGN PATENT DOCUMENTS

CN        101678751 A      3/2010
JP        2001-107763 A    4/2001
(Continued)

*Primary Examiner* — Jacob S Scott
*Assistant Examiner* — Tinh Dang
(74) *Attorney, Agent, or Firm* — Andrews Kurth Kenyon LLP

(57) ABSTRACT

A hybrid system includes: an engine; a motor/generator; an automatic clutch; a differential device including first, second, and third rotational elements; a first transmission mechanism; a second transmission mechanism; and a control device, the automatic clutch being provided between the engine and the first transmission mechanism, an input of the first transmission mechanism being connected to the automatic clutch and the second rotational element, the motor/generator being connected to the first rotational element, the third rotational element of the differential device being connected to the second transmission mechanism, the first and the second transmission mechanisms include the same output shaft connected to the wheels. In an electric vehicle driving mode, the control device performs control on the automatic clutch and the first and second transmission mechanisms to drive torque from the first transmission mechanism to the engine to start the engine.

7 Claims, 32 Drawing Sheets

(51) Int. Cl.
*B60W 10/02* (2006.01)
*B60W 10/06* (2006.01)
*B60W 10/08* (2006.01)
*B60W 10/10* (2012.01)
*B60W 20/00* (2016.01)
*B60W 20/40* (2016.01)
*B60K 6/365* (2007.10)
*B60K 6/48* (2007.10)
*B60W 20/10* (2016.01)
*B60W 10/113* (2012.01)

(52) U.S. Cl.
CPC ............... *B60K 6/48* (2013.01); *B60W 10/02* (2013.01); *B60W 10/06* (2013.01); *B60W 10/08* (2013.01); *B60W 10/10* (2013.01); *B60W 10/113* (2013.01); *B60W 20/10* (2013.01); *B60W 2710/021* (2013.01); *Y02T 10/6221* (2013.01); *Y02T 10/6286* (2013.01); *Y10S 903/93* (2013.01); *Y10T 477/26* (2015.01)

(56) References Cited

U.S. PATENT DOCUMENTS

| | | | | |
|---|---|---|---|---|
| 6,685,591 | B2* | 2/2004 | Hanyu | B60K 6/36 180/65.225 |
| 7,347,116 | B2 | 3/2008 | Sakamoto et al. | |
| 8,075,436 | B2* | 12/2011 | Bachmann | B60K 6/365 475/209 |
| 8,585,522 | B2* | 11/2013 | Kaltenbach | B60W 10/06 475/218 |
| 8,641,573 | B2* | 2/2014 | Ideshio | B60K 6/365 475/218 |
| 8,784,245 | B2* | 7/2014 | Ideshio | B60K 6/36 475/5 |
| 9,327,713 | B2* | 5/2016 | Kaltenbach | B60K 6/387 |
| 2010/0009805 | A1* | 1/2010 | Bachmann | B60K 6/365 477/5 |
| 2010/0173746 | A1* | 7/2010 | Ideshio | B60K 6/365 477/36 |
| 2010/0197436 | A1* | 8/2010 | Ideshio | B60K 6/365 475/8 |
| 2010/0200319 | A1* | 8/2010 | Tanba | B60K 6/38 180/65.285 |
| 2012/0035013 | A1* | 2/2012 | Appeltauer | B60K 6/365 475/1 |
| 2013/0288850 | A1* | 10/2013 | Kaltenbach | B60K 6/387 477/5 |

FOREIGN PATENT DOCUMENTS

| | | |
|---|---|---|
| JP | 2002-204504 A | 7/2002 |
| JP | 2002-262409 A | 9/2002 |
| JP | 2005-155508 A | 6/2005 |

* cited by examiner

FIG.1

|  | FIRST TRANSMISSION | SECOND TRANSMISSION |
|---|---|---|
| 1st | 3.5 | 3.5 |
| 2nd | 2.0 | 2.0 |
| 3rd | 1.3 | 1.3 |
| 4th | 0.9 | 0.9 |
| 5th | 0.7 | 0.7 |
| DIFFERENTIAL DEVICE | 4.5 ||

FIG.10

|  | $Vev_{max}$ |
|---|---|
| 1st | 14 |
| 2nd | 25 |
| 3rd | 39 |
| 4th | 56 |
| 5th | 72 |

FIG.11

| | | SECOND TRANSMISSION | | | |
|---|---|---|---|---|---|
| | | 1st | 2nd | 3rd | 4th |
| FIRST TRANSMISSION | 4th | 35.0 | 12.5 | 2.0 | -4.1 |
| | 5th | 38.9 | 16.4 | 5.9 | -0.2 |

FIG.12

| | | $Vev_{max}$ | $Fev_{max}$ |
|---|---|---|---|
| $G_{mg-w}$ | 2.0 | 580 | 650 |
| | 5.9 | 193 | 1950 |
| | 12.5 | 91 | 4150 |
| | 16.4 | 69 | 5450 |
| | 35.0 | 32 | 11650 |
| | 38.9 | 29 | 12950 |

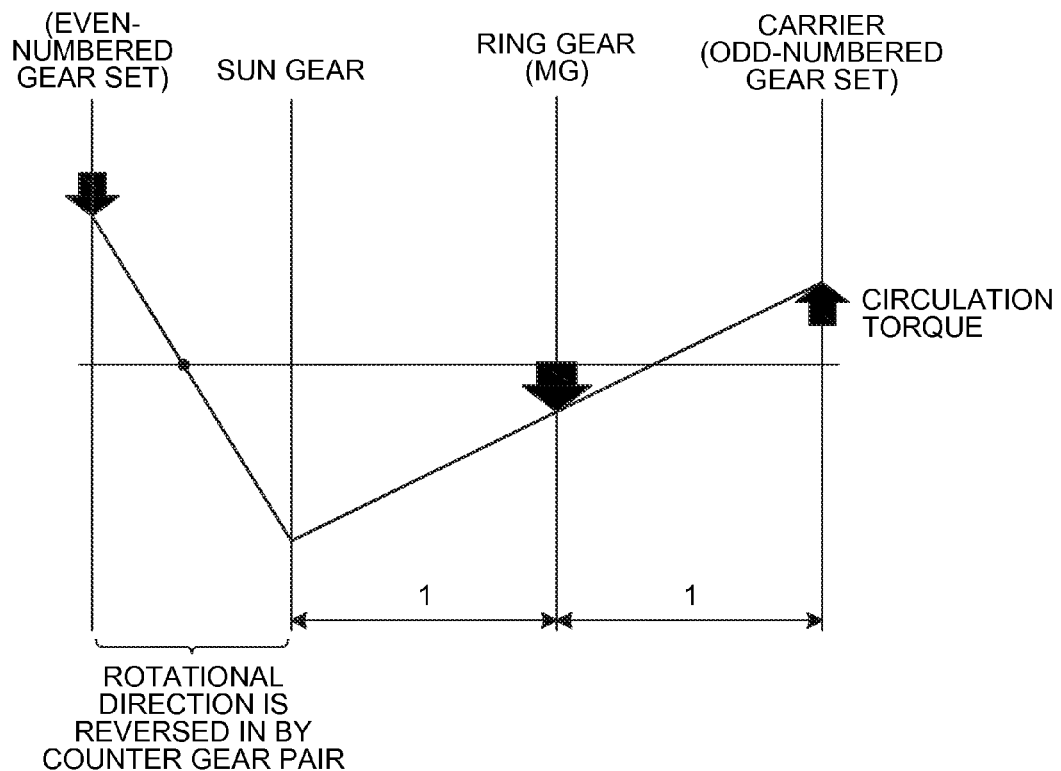

FIG.27

|  |  | EVEN-NUMBERED GEAR SET ||
|---|---|---|---|
|  |  | 2nd | 4th |
| ODD-NUMBERED GEAR SET | 1st | 13.5 | 23.4 |
|  | 3rd | 6.3 | 3.6 |
|  | 5th | 11.7 | 1.8 |

FIG.28

|  |  | $Vev_{max}$ | $Fev_{max}$ |
|---|---|---|---|
| $G_{mg\text{-}w}$ | 23.4 | 48 | 7800 |
|  | 3.6 | 314 | 1200 |
|  | 11.7 | 97 | 3900 |
|  | 1.8 | 628 | 600 |

HYBRID SYSTEM CONTROL DEVICE

CROSS-REFERENCE TO RELATED APPLICATIONS

This is a national phase application based on the PCT International Patent Application No. PCT/JP2012/056034 filed Mar. 8, 2012, the entire contents of which are incorporated herein by reference.

FIELD

The present invention relates to a control device of a hybrid system including an engine, a motor/generator, an automatic clutch to one engaging unit side of which an engine rotary shaft is connected, a differential device provided with a plurality of rotational elements to each of which a rotary shaft of the motor/generator and the other engaging unit side of the automatic clutch are separately connected, a first transmission provided with at least one gear position connected to the rotational element of the differential device to which the other engaging unit side of the automatic clutch is connected, and a second transmission provided with at least one gear position connected to another rotational element of the differential device.

BACKGROUND

For example, this type of hybrid system is disclosed in following Patent Literatures 1 to 3. In a hybrid system of Patent Literature 1, five gear positions and a reverse gear are arranged as a first transmission and five gear positions and a reverse gear having gear ratios different from those of the five gear positions and the reverse gear of the first transmission are arranged as a second transmission. The first and second transmissions include rotary shafts (input shafts) connected to different rotational elements of a differential device and a common output shaft. The hybrid system performs EV (electric vehicle) driving by controlling the first transmission to be in a neutral state and transmitting an output of a motor/generator to a driving wheel through the second transmission. The motor/generator during the EV driving outputs negative motor torque. When an engine is started from the EV driving, the motor/generator is allowed to output positive motor torque and the motor torque is transmitted not only to a driving wheel but also to the engine to increase an engine speed.

In a hybrid system of Patent Literature 2, odd-numbered gears and even-numbered gears of a dual clutch transmission are used as first and second transmissions, respectively, and a first input shaft of the odd-numbered gears and a second input shaft of the even-numbered gears are connected to different rotational elements of a differential device. Meanwhile, in the dual clutch transmission, a reverse gear is arranged on the second input shaft. In a hybrid system of Patent Literature 3, a so-called automatic control manual transmission is used as a first transmission and high and low two gear positions are arranged as a second transmission; an input shaft and a rotary shaft of the high and low two gear positions of the manual transmission are connected to different rotational elements of a differential device.

CITATION LIST

Patent Literature

Patent Literature 1: Japanese Patent Application Laid-open No. 2005-155508

Patent Literature 2: Japanese Patent Application Laid-open No. 2002-204504

Patent Literature 3: Japanese Patent Application Laid-open No. 2002-262409

SUMMARY

Technical Problem

In the conventional hybrid system, when the engine is started during the EV driving, the motor torque is changed from negative to positive while the first transmission is kept in the neutral state for increasing the engine speed, so that reaction force in a vehicle rearward movement direction might be generated on the output shaft (that is to say, driving wheel side) on which reaction force in a vehicle forward movement direction is generated during the EV driving, thereby generating large shock in a vehicle. In the conventional hybrid system, the motor torque cannot be used for inhibiting generation of the shock.

Herein, Patent Literature 1 described above also discloses technology to perform the EV driving by shifting the second transmission into the reverse gear and outputting the positive motor torque. Meanwhile, at that time, reaction force of the motor/generator becomes torque in a rotational direction to normally rotate the engine, so that the torque in the positive direction is transmitted to the driving wheel without rotating the engine by making the torque smaller than minimum torque (compression torque) required for rotating the engine. In the hybrid system, the positive motor torque is instantaneously increased when the engine is started during such EV driving, so that the reaction force in the vehicle forward movement direction is generated on the output shaft. Therefore, there is no change in the direction of the reaction force generated on the output shaft in this case, so that it is possible to reduce the shock generated on the output shaft, but there is possibility that the generation of the shock cannot be inhibited.

An object of the present invention is to improve disadvantages of the conventional examples and to provide the control device of the hybrid system capable of starting the engine during the EV driving in which the generation of the shock is inhibited.

Solution to Problem

In order to achieve the above mentioned object, a control device of a hybrid system according to the present invention includes an engine; a motor/generator; an automatic clutch to one engaging unit side of which an engine rotary shaft is connected; a differential device provided with a plurality of rotational elements to each of which a rotary shaft of the motor/generator and the other engaging unit side of the automatic clutch are separately connected; a first transmission an input shaft of which is connected to a rotational element of the differential device to the same rotational element the other engaging unit side of the automatic clutch is connected; a second transmission an input shaft of which is connected to another rotational element of the differential device; and an output shaft connected to a driving wheel side, wherein at the time of EV driving in which only an output of the motor/generator is used, transmission control is performed such that the first transmission and the second transmission perform torque transmission between the input shaft and the output shaft, respectively and the automatic clutch is disengaged, and at the time the engine is started during the EV driving, an engine speed is increased by engagement of the automatic clutch during the EV driving and a decreased amount of driving torque decreased accompanied by the engagement of the automatic clutch is compensated by output torque of the motor/generator.

Here, it is desirable that at the time of the EV driving, the transmission control and disengaging control of the automatic clutch are performed to generate circulation torque transmitted through the first transmission to the differential device and being a part of the driving torque transmitted from the motor/generator through the second transmission to the driving wheel, and at the time the engine is started, a part of the circulation torque is transmitted to the engine by engaging control of the automatic clutch.

Further, it is desirable that the automatic clutch is semi-engaged at the time the engine is started.

Further, it is desirable that an engine start by the engaging control of the automatic clutch is executed at the time an engine start speed is not higher than a rotational speed of the other engaging unit of the automatic clutch, and at the time the engine start speed is higher than the rotational speed of the other engaging unit of the automatic clutch, the engine is started by using a starter motor.

Advantageous Effects of Invention

In the control device of the hybrid system according to the present invention, the engine can be started by the engagement of the automatic clutch during the EV driving and the decreased amount of the driving torque decreasing accompanied by the engagement of the automatic clutch is compensated by the output torque of the motor/generator, so that this can inhibit the generation of the shock when the engine is started.

BRIEF DESCRIPTION OF DRAWINGS

FIG. 1 is a view illustrating a configuration of an embodiment of a control device of a hybrid system according to the present invention and the hybrid system to which this is applied.

FIG. 10 is a view illustrating a calculation result of an EV maximum vehicle speed in each gear position in the hybrid system of the embodiment.

FIG. 11 is a view illustrating an intermediate result of narrowing candidates for a target gear position at the time the EV driving in the hybrid system of the embodiment.

FIG. 12 is a view illustrating calculation results of the EV maximum vehicle speed and EV maximum driving force in narrowed candidates.

FIG. 25 is an alignment chart of a differential device at the time of the EV driving of the variation.

FIG. 26 is a view illustrating an example of gear ratios of a dual clutch transmission and a gear ratio of a differential device in the hybrid system of the variation.

FIG. 27 is a view illustrating an intermediate result of narrowing candidates for a target gear position at the time of the EV driving in the hybrid system of the variation.

FIG. 28 is a view illustrating calculation results of the EV maximum vehicle speed and EV maximum driving force in narrowed candidates.

DESCRIPTION OF EMBODIMENTS

An embodiment of a control device of a hybrid system according to the present invention is hereinafter described in detail with reference to the drawings. The hybrid system to which the control device according to the present invention is applied includes an engine, a motor/generator, an automatic clutch to one engaging unit side of which an engine rotary shaft is connected, a differential device provided with a plurality of rotational elements to each of which a rotary shaft of the motor/generator and the other engaging unit side of the automatic clutch are separately connected, a first transmission provided with at least one gear position connected to the rotational element of the differential device to which the other engaging unit side of the automatic clutch is connected, and a second transmission provided with at least one gear position connected to another rotational element of the differential device. Meanwhile, the present invention is not limited by the embodiment.

[Embodiment]

An embodiment of a control device of a hybrid system according to the present invention is described with reference to FIGS. 1 to 38.

Figure 1:
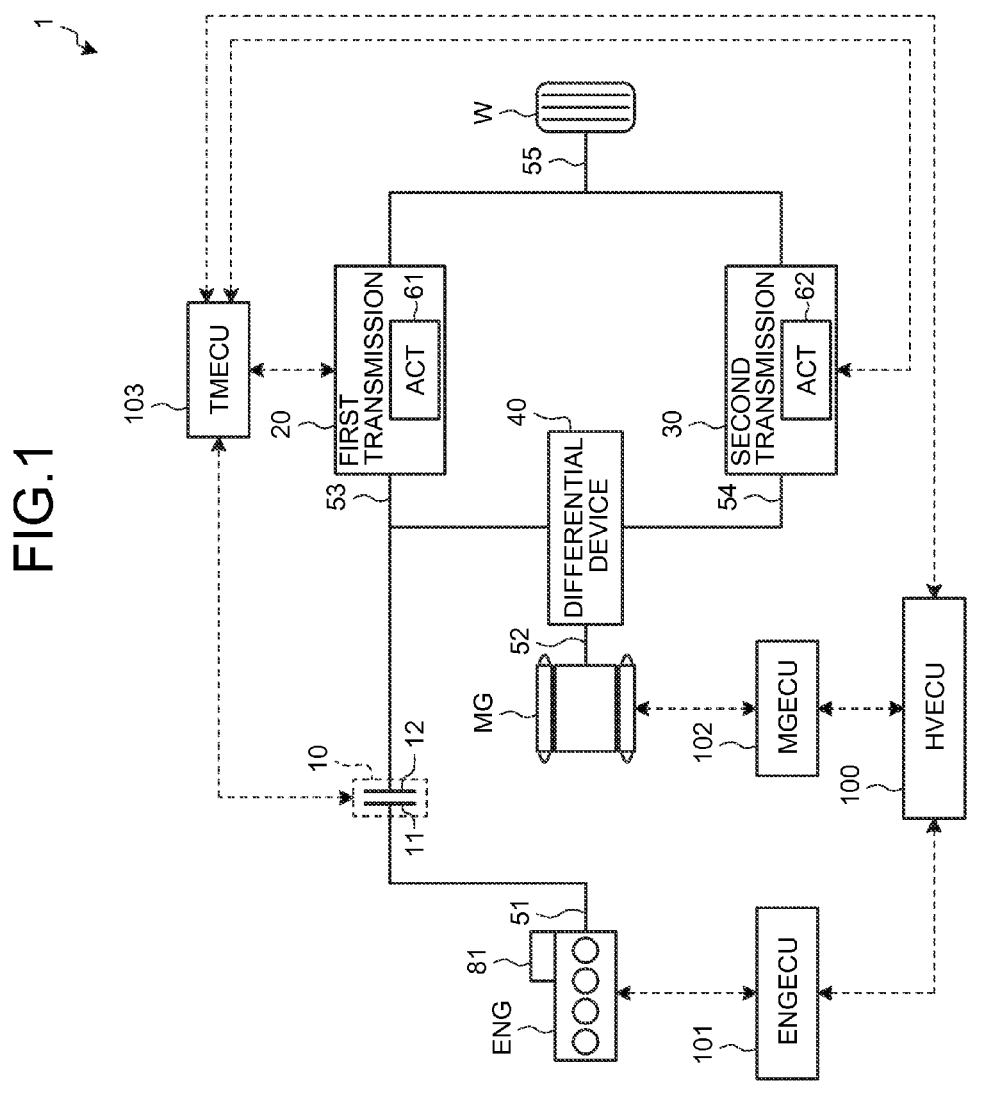
Figure 2:
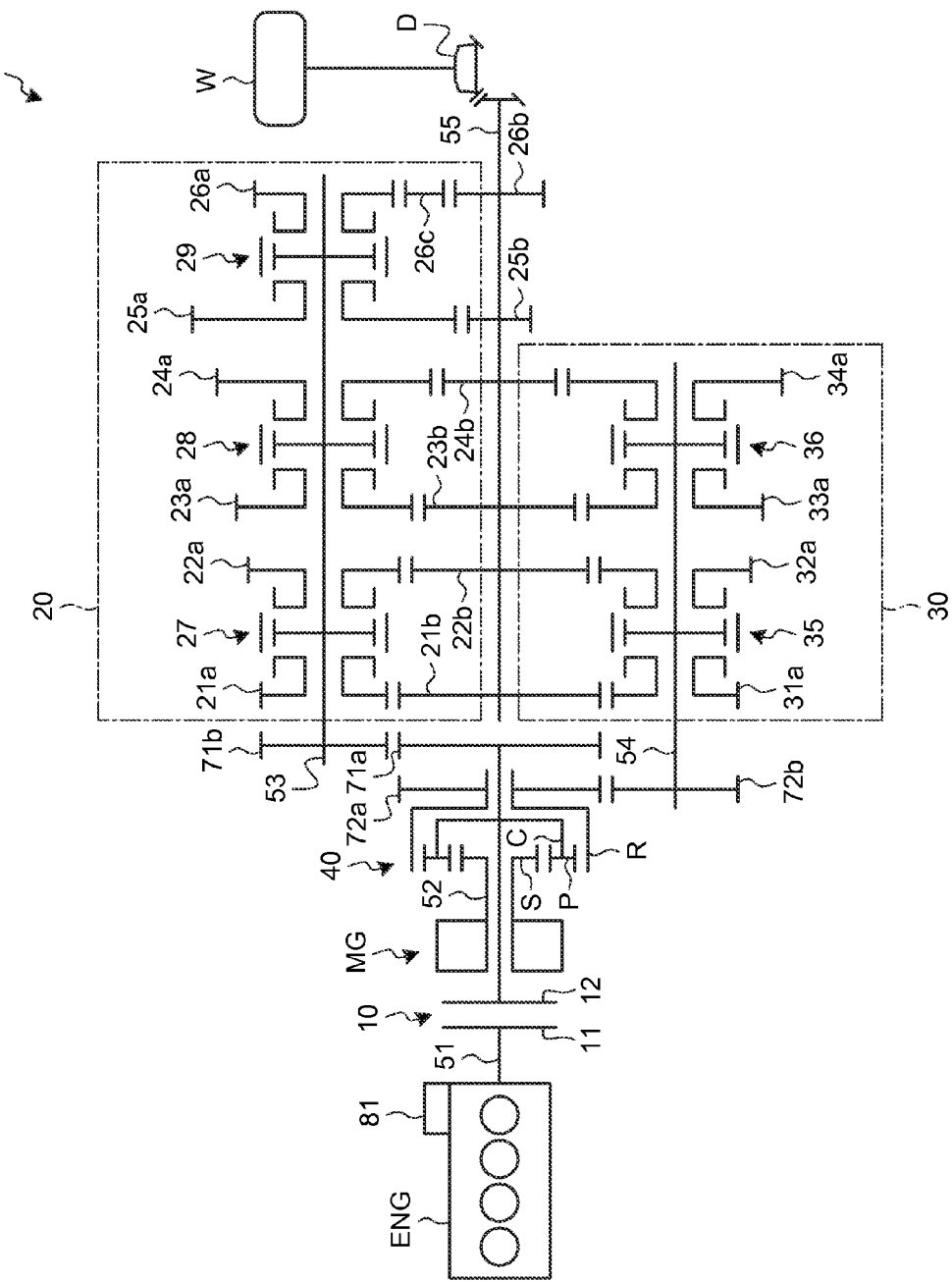
FIG. 2 is a view illustrating an example of a specific configuration of the hybrid system of the embodiment.

Reference sign 1 in FIGS. 1 and 2 represents a hybrid system of this embodiment. FIG. 1 is a simplified diagram of a configuration of the hybrid system 1 of this embodiment. FIG. 2 illustrates a specific example of the hybrid system 1 of this embodiment.

The hybrid system 1 is provided with an engine ENG, a motor/generator MG, an automatic clutch 10, a first transmission 20, a second transmission 30, and a differential device 40.

The engine ENG is a mechanical power source such as an internal-combustion engine and an external-combustion engine which outputs mechanical power (engine torque) from an engine rotary shaft (crankshaft) 51. Operation of the engine ENG is controlled by an electronic control device for controlling the engine (hereinafter, referred to as an "engine ECU (ENGECU)") 101. The motor/generator MG acts as a motor (electrical motor) at the time of power running driving and converts electrical energy supplied from a secondary battery (not illustrated) to mechanical energy to output mechanical power (motor torque) from an MG rotary shaft 52. On the other hand, this can act as a generator (electrical generator) at the time of regenerating driving and can convert the mechanical energy to the electrical energy when the mechanical power (motor torque) is input from the differential device 40 to the MG rotary shaft 52 to accumulate the same in the secondary battery as electrical power. The motor/generator MG is controlled by an electronic control device for controlling the motor/generator (hereinafter, referred to as an "MGECU") 102.

In the automatic clutch 10, a first engaging unit 11 on one side (engine torque input side) is connected to the engine rotary shaft 51 and a second engaging unit 12 on the other side is connected to the first transmission 20 to be described later. In this illustration, the second engaging unit 12 is connected to a rotary shaft 53 of the first transmission 20 through a carrier C of the differential device 40 (FIG. 2). The automatic clutch 10 is a friction clutch, a disengaged state, a fully-engaged state, or a semi-engaged state of which are created by control of a gap between the first and second engaging units 11 and 12. The disengaged state refers to a state in which the first and second engaging units 11 and 12 are not in contact with each other and torque transmission cannot be performed therebetween. On the other hand, the fully-engaged state and the semi-engaged state refer to states in which the first and second engaging units 11 and 12 are in contact with each other and the torque transmission can be performed therebetween. Out of them, the fully-engaged state refers to a state in which the first and second engaging units 11 and 12 integrally rotate at a same rotational speed. The semi-engaged state refers to a state in which the first and second engaging units 11 and 12 rotate so as to slide on each other, the engaged state at a transitional phase between the disengaged state and the fully-engaged state.

Herein, the automatic clutch 10 can transmit the engine torque to the rotary shaft 53 of the first transmission 20 in the fully-engaged state or the semi-engaged state. Furthermore, since the MG rotary shaft 52 is also connected to the rotary shaft 53 through the differential device 40, the motor torque at the time of the power running driving can also be transmitted to the rotary shaft 53. For example, it is possible to transmit the motor torque to an output shaft 55 by engaging a first, second, or third transmission control unit 27, 28, or 29 to be described later of the first transmission 20 with a first or second transmission control unit 35 or 36 of the second transmission 30. In the first transmission 20, the engine torque and the motor torque are output from the output shaft 55 to be transmitted to a driving wheel W through a differential device (differential gear) D.

The first transmission 20 is an automatic transmission including at least one gear position. For example, the first transmission 20 is a so-called automatic control manual transmission in which engagement or disengagement of the automatic clutch 10 is controlled by an electronic control device for transmission control (hereinafter, referred to as a "transmission ECU (TMECU)" 103. Therefore, the first transmission 20 includes a configuration similar to that of a general manual transmission (transmission control unit such as a gear pair, a plurality of meshing clutches, a plurality of sleeves and the like according to the gear position).

For example, the first transmission 20 herein illustrated includes first to fifth-speed forward gear positions and a reverse gear. Drive gears 21a, 22a, 23a, 24a, and 25a for first to fifth speeds and a reverse drive gear 26a are attached to the rotary shaft 53 being an input shaft of the engine torque and the like (FIG. 2). Driven gears 21b, 22b, 23b, 24b, and 25b for the first to fifth speeds and a reverse driven gear 26b are attached to the output shaft 55. A reverse intermediate gear 26c is interposed between the reverse drive gear 26a and the reverse driven gear 26b. Furthermore, a first transmission control unit 27 which selects the first speed or the second speed as a used gear position, a second transmission control unit 28 which selects the third speed or the fourth speed as the used gear position, and a third transmission control unit 29 which selects the fifth speed or the reverse gear as the used gear position are provided on the rotary shaft 53.

When the transmission ECU 103 detects a target gear position of the first transmission 20, this appropriately moves the sleeve of the first, second, or third transmission control unit 27, 28, or 29 according to the target gear position by an actuator 61 to fully engage or disengage the meshing clutches of the first to third transmission control units 27 to 29 according to the target gear position, thereby shifting into the target gear position. The transmission ECU 103 controls the actuator 61 to move the sleeve so as to disengage the meshing clutches of the first to third transmission control units 27 to 29, thereby putting the first transmission 20 into a neutral state.

The second transmission 30 is an automatic transmission including at least one gear position. For example, the second transmission 30 herein illustrated includes first to fourth-speed forward gear positions. Drive gears 31a, 32a, 33a, and 34a for the first to fourth speeds are attached to a rotary shaft 54 being an input shaft of the engine torque and the like (FIG. 2). Herein, the first transmission 20 and the second transmission 30 share the output shaft 55 in this illustration. In the second transmission 30, the driven gears 21b, 22b, 23b, and 24b for the first to fourth speeds of the first transmission 20 are used as the driven gears of the drive gears 31a, 32a, 33a, and 34a, respectively. Therefore, gear ratios of the first to fourth speeds of the second transmission 30 of this illustration are set the same as those of the first to fourth speeds of the first transmission 20, respectively. Furthermore, a first transmission control unit 35 which selects the first speed or the second speed as the used gear position and a second transmission control unit 36 which selects the third speed or the fourth speed as the used gear position are provided on the rotary shaft 54.

The transmission ECU 103 sets the target gear position of the second transmission 30 at the time of vehicle start or gear shift operation of the first transmission 20, for example, and appropriately moves the sleeve of the first or second transmission control unit 35 or 36 according to the target gear position by an actuator 62 to fully engage or disengage the meshing clutches of the first and second transmission control units 35 and 36 according to the target gear position, thereby shifting into the target gear position. The transmission ECU 103 controls the actuator 62 to move the sleeve so as to disengage the meshing clutches of the first and second transmission control units 35 to 36, thereby putting the second transmission 30 into the neutral state.

The differential device 40 is provided with a plurality of rotational elements engaging with each other in which differential operation is performed between the rotational elements. The differential device 40 of the hybrid system 1 is at least provided with a first rotational element connected to the MG rotary shaft 52, a second rotational element connected to the second engaging unit 12 of the automatic clutch 10 and the rotary shaft 53 of the first transmission 20, and a third rotational element connected to the rotary shaft 54 of the second transmission 30. As a specific example, the differential device 40 is provided with a so-called planetary gear mechanism (FIG. 2). For example, when the differential device 40 includes a single-pinion planetary gear mechanism, a sun gear S is connected to the MG rotary shaft 52. The second engaging unit 12 of the automatic clutch 10 is connected to the carrier C which holds a pinion gear P and the rotary shaft 53 of the first transmission 20 is connected thereto through a gear pair (gears 71a and 71b). The rotary shaft 54 of the second transmission 30 is connected to a ring gear R through a gear pair (gears 72a and 72b).

The hybrid system 1 has the above-described configuration, so that this can transmit the engine torque to the driving wheel W through the differential device 40 and the second transmission 30 by making the motor/generator MG to bear reaction force of the engine torque at the time of the vehicle start, gear shift, EV driving and the like.

In the hybrid system 1, an integrated ECU (hereinafter, referred to as a "HVECU") 100 which generally controls the engine ECU 101, the MGECU 102, and the transmission ECU 103 is provided and they form the control device.

The HVECU 100 selects an engine driving mode to drive only by the power of the engine ENG, an EV driving mode to drive only by the power of the motor/generator MG, or a hybrid driving mode to drive by the power of both of them based on an SOC (state of charge) of the secondary battery, a temperature, an accelerator position and the like.

Figure 3:
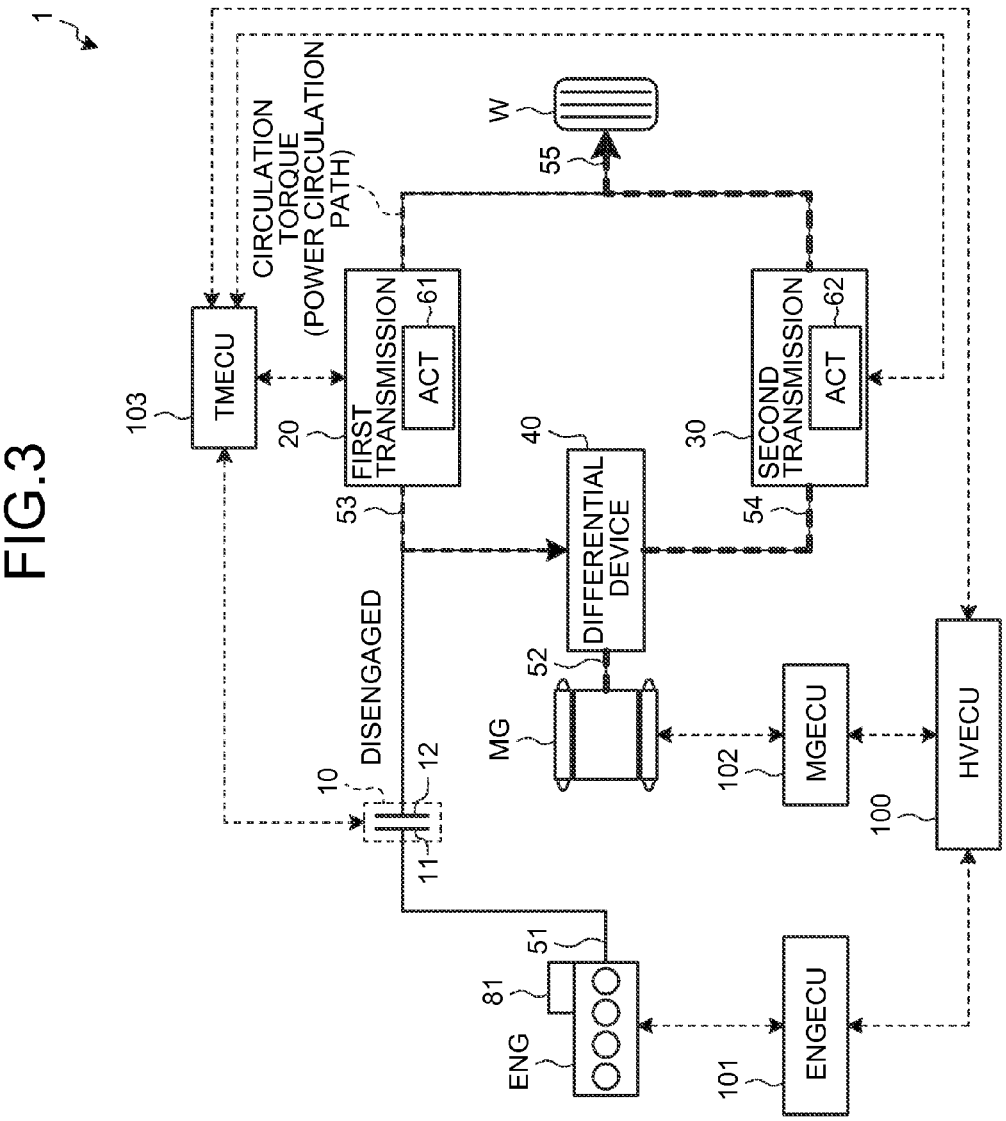
FIG. 3 is a view illustrating a power transmission path at the time of EV driving of the embodiment.
Figure 4:
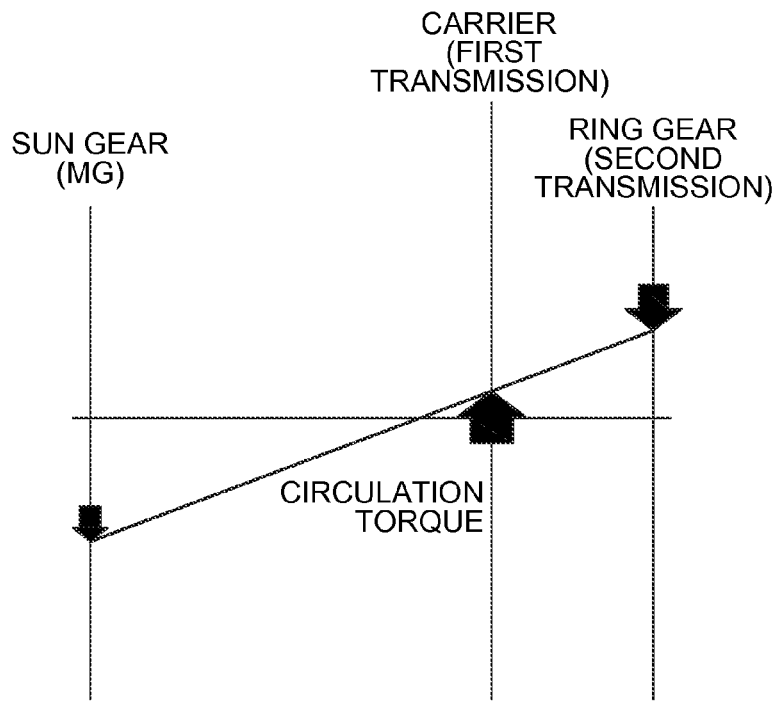
FIG. 4 is an alignment chart of a differential device during the EV at the time of the embodiment.

For example, in the hybrid system 1, the automatic clutch 10 is disengaged and the first and second transmissions 20 and 30 are shifted into the target gear positions at the time of the EV driving. The hybrid system 1 allows the motor/generator MG to output negative motor torque, thereby generating torque in a positive direction (vehicle forward movement direction) in the carrier C of the differential device 40 (that is to say, the driving wheel W). FIGS. 3 and 4 illustrate a power transmission path and an alignment chart, respectively, during the EV driving. Torque in the ring gear R is decelerated by the target gear position of the second transmission 30 and a part thereof is accelerated by the target gear position of the first transmission 20, then the torque in the positive direction in the carrier C is generated. The torque accelerated by the first transmission 20 is transmitted to the carrier C. In the hybrid system 1, power circulation is generated at the time of such EV driving. Hereinafter, such torque accelerated by the first transmission 20 to return to the differential device 40 without being transmitted to the driving wheel W, that is to say, the torque being a part of the torque output from the second transmission 30 returning to the differential device 40 through the first transmission 20 is referred to as "circulation torque".

Herein, the target gear positions of the first and second transmissions 20 and 30 during the EV driving are described. Meanwhile, during the EV driving, it is desirable that the target gear positions are not changed, that is to say, the gear shift of the first and second transmissions 20 and 30 is not performed in order to prevent torque loss associated with the gear shift.

Following points are taken into consideration when the target gear positions are determined.

The points which should be taken into consideration when the target gear position of the first transmission 20 is determined are first described. At the time of the EV driving, the gear position (gear ratio) of the first transmission 20 is determined, and according to this, relationship between a vehicle speed and a rotational speed of the rotary shaft 53 of the first transmission 20 and relationship between the vehicle speed and the rotational speed of the second engaging unit 12 of the automatic clutch 10 are uniquely determined. Therefore, the target gear position of the first transmission 20 is set to that of the gear ratio with which the rotational speed of the second engaging unit 12 of the automatic clutch 10 is not higher than a predetermined rotational speed also at the time of driving at a maximum vehicle speed at the time of the EV driving (hereinafter, referred to as "EV maximum vehicle speed") $Vev_{max}$.

The EV maximum vehicle speed $Vev_{max}$ (km/h) can be obtained by following equation 1.

$$Vev_{max} = Nmg_{max} * 2\pi * r * 60/(G_{mg\text{-}w} * 1000) \qquad (1)$$

Figure 5:
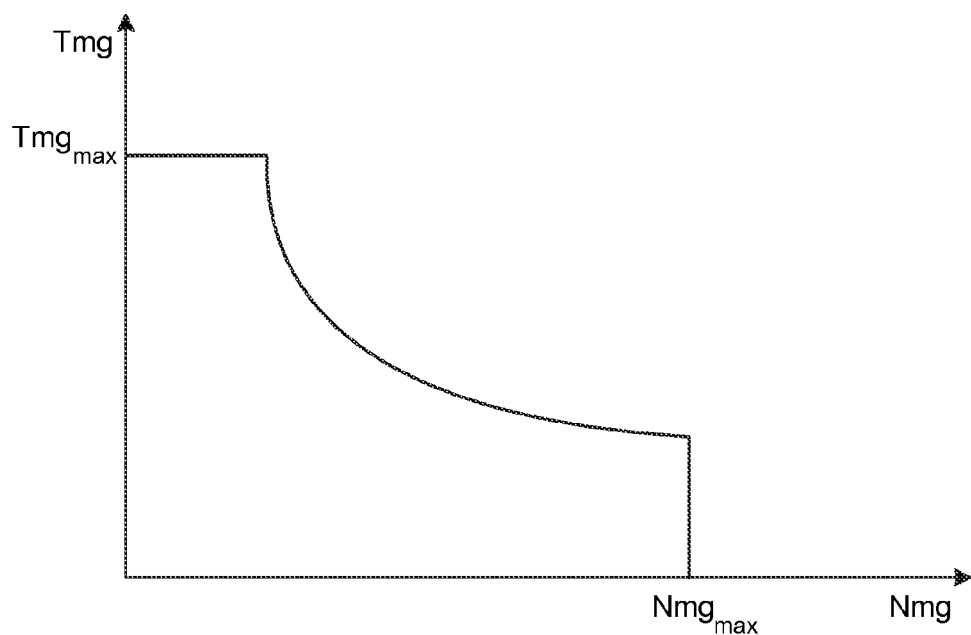
FIG. 5 is a view illustrating relationship between a rotational speed of a motor/generator and output torque.

"$Nmg_{max}$" represents a maximum rotational speed of the motor/generator MG (hereinafter, referred to as "MG maximum rotational speed"). FIG. 5 illustrates an example of relationship between the rotational speed Nmg of the motor/generator MG and output torque Tmg. "r" represents a radius of the driving wheel W. "$G_{mg\text{-}w}$" representing a gear ratio between the motor/generator MG and the driving wheel W can be obtained by following equation 2.

$$G_{mg\text{-}w} = \{1/\rho * G2 - (1+\rho)/\rho * G1\} * G_{diff} \quad (2)$$

"ρ" represents a gear ratio (so-called planetary gear ratio) of the differential device 40. "G1" represents a gear ratio of an object gear position (certain gear position such as the target gear position and used gear position) of the first transmission 20. "G2" represents a gear ratio of an object gear position (certain gear position such as the target gear position and used gear position) of the second transmission 30. "$G_{diff}$" represents a gear ratio of the differential device D.

Herein, when the engine is started during the EV driving, the above-described circulation torque is replaced with the engine torque as described later; since the engine torque is transmitted to the second engaging unit 12 of the automatic clutch 10 while the automatic clutch 10 slides in the semi-engaged state at that time, so that the engine torque is transmitted to the second engaging unit 12 only when an engine speed is higher than the rotational speed of the second engaging unit 12. Therefore, when the rotational speed of the second engaging unit 12 during the EV driving is higher than the predetermined rotational speed, it is required to make the engine speed higher than the rotational speed of the second engaging unit 12 when the engine is started, so that a passenger of the vehicle might feel racing of the engine ENG. Therefore, the target gear position of the first transmission 20 is set to that of the gear ratio with which the rotational speed of the second engaging unit 12 of the automatic clutch 10 is not higher than the predetermined rotational speed also at the time of the driving at the EV maximum vehicle speed Vev$_{max}$ in order to inhibit unnecessary racing of the engine ENG when the engine is started during the EV driving. Therefore, the predetermined rotational speed may be set to the rotational speed at which the passenger does not feel uncomfortable about an increase in the engine speed (racing), for example. That is to say, the target gear position of the first transmission 20 is set to that of the gear ratio with which the rotational speed of the second engaging unit 12 is not higher than the predetermined rotational speed (engine speed) at which the driver does not feel the racing of the engine ENG also when the engine ENG is started at the EV maximum vehicle speed Vev$_{max}$.

The points which should be taken into consideration when the target gear position of the second transmission 30 is determined are next described. The target gear position of the second transmission 30 is set to that of the gear ratio which realizes the gear ratio G$_{mg\text{-}w}$ realizing target values of the EV maximum vehicle speed Vev$_{max}$ and maximum driving force of the vehicle at the time of the EV driving (hereinafter, referred to as "EV maximum driving force") Fev$_{max}$. The target values may be determined in the following manner.

Figures 6, 7:
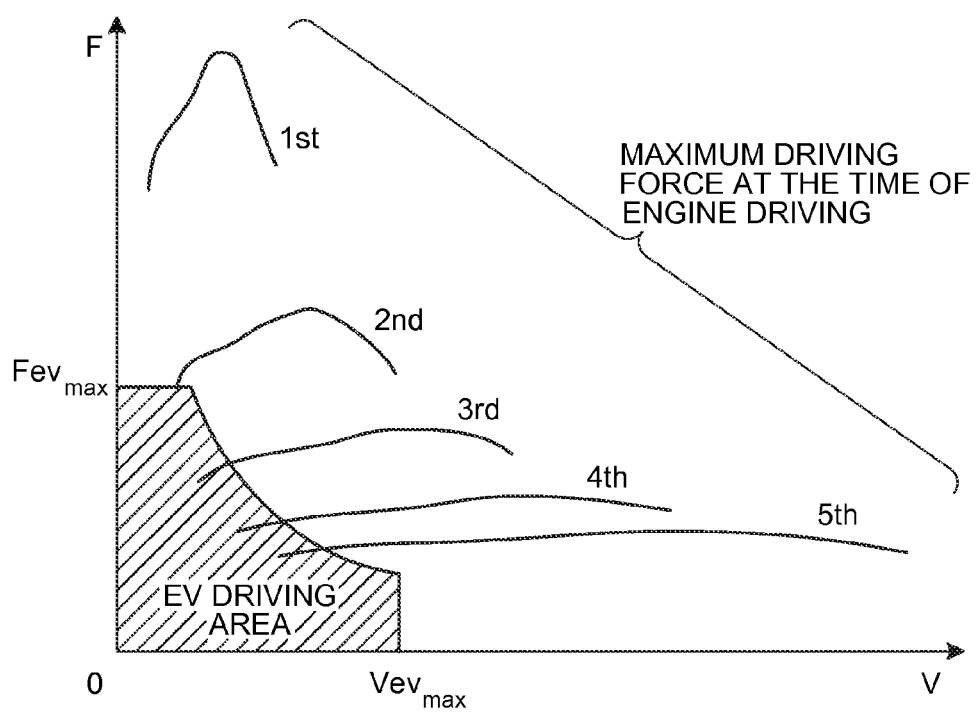
FIG. 6 is a view illustrating relationship between a vehicle speed and driving force of a vehicle in the hybrid system of the embodiment.
FIG. 7 is a view illustrating an example of gear ratios of first and second transmissions and a gear ratio of a differential device in the hybrid system of the embodiment.
Figure 8:
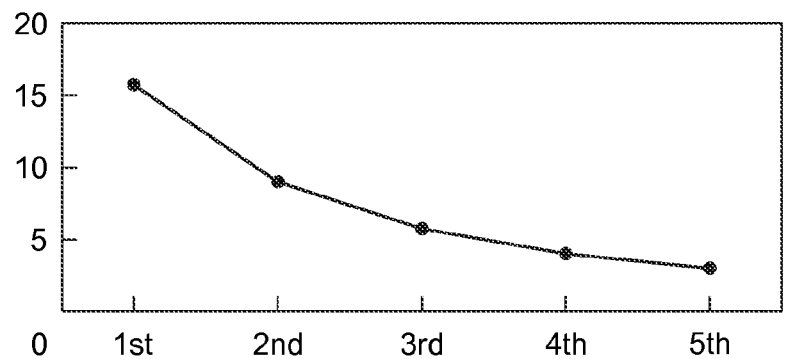
FIG. 8 is a view illustrating a calculation result for each gear position regarding a total gear ratio of the power transmission path in the hybrid system of the embodiment.

FIG. 6 illustrates an example of relationship between a vehicle speed V and driving force F of the vehicle. In FIG. 6, a hatched area is an EV driving area. In FIG. 6, the maximum driving force at the time of engine driving is indicated for each gear position of the first transmission 20.

In the motor/generator MG, the MG maximum rotational speed Nmg$_{max}$ and maximum torque (hereinafter, referred to as "MG maximum torque") Tmg$_{max}$ are limited as illustrated in FIG. 5. Therefore, the EV maximum vehicle speed Vev$_{max}$ is limited by the MG maximum rotational speed Nmg$_{max}$. The EV maximum driving force Fev$_{max}$ is limited by the MG maximum torque Tmg$_{max}$. Furthermore, the EV maximum vehicle speed Vev$_{max}$ and the EV maximum driving force Fev$_{max}$ are determined according to various conditions such as a cruise distance of the EV driving and a capacity of the secondary battery, for example.

Herein, the EV maximum vehicle speed Vev$_{max}$ becomes lower as the gear ratio G$_{mg\text{-}w}$ becomes larger as is understood from equation 1. When the EV maximum vehicle speed Vev$_{max}$ is too low, it is required to immediately start the engine ENG after the vehicle starts, for example, so that fuel consumption is not improved well by the EV driving. On the other hand, the EV maximum driving force Fev$_{max}$ becomes smaller as the gear ratio G$_{mg\text{-}w}$ becomes smaller as is understood from following equation 3. When the EV maximum driving force Fev$_{max}$ is too small also, it might be required to immediately start the engine ENG due to torque deficiency after the vehicle starts, for example, so that the fuel consumption is not improved well by the EV driving. Therefore, the target values of the EV maximum vehicle speed Vev$_{max}$ and the EV maximum driving force Fev$_{max}$ may be set such that desired improvement in fuel consumption may be obtained.

$$Fev_{max} = Tmg_{max} * G_{mg\text{-}w}/r \quad (3)$$

Hereinafter, the target gear positions of the first and second transmissions 20 and 30 during the EV driving are described with reference to a specific example. Meanwhile, numerical values of the gear ratio and the like herein illustrated are conventionally set for the purpose of description.

FIG. 7 illustrates an example of the gear ratios G1 and G2 of the gear positions of the first and second transmissions 20 and 30, respectively, and an example of the gear ratio G$_{diff}$ of the differential device D. Herein, the gear ratios G1 and G2 of the same gear position of the first and second transmissions 20 and 30 are the same. Suppose that the gear ratio ρ of the differential device 40 is 0.3 and the radius r of the driving wheel W is 0.3 (m). Herein, the predetermined rotational speed at which the passenger does not feel uncomfortable about the increase in the engine speed is set to 2,000 (rpm). Meanwhile, a total gear ratio (=G1*G$_{diff}$) of the power transmission path through the first transmission 20 and a total gear ratio (=G2*G$_{diff}$) of the power transmission path through the second transmission 30 are indicated for each gear position in FIG. 8.

Figure 9:
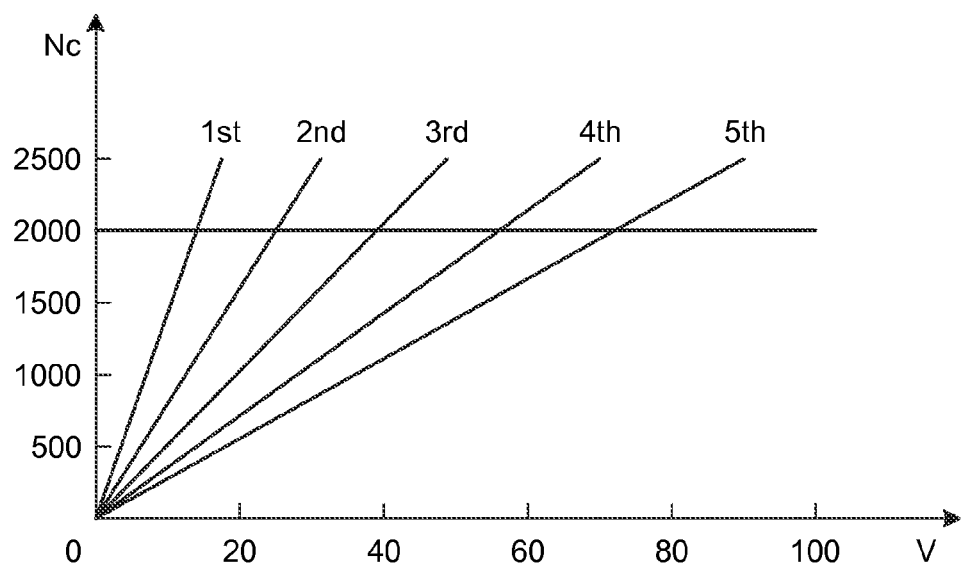
FIG. 9 is a view illustrating an example of a rotational speed of a second engaging unit according to the vehicle speed in the hybrid system of the embodiment for each gear position.

First, candidates for the target gear position of the first transmission 20 are narrowed. As described above, the target gear position of the first transmission 20 is set to that of the gear ratio with which a rotational speed Nc of the second engaging unit 12 of the automatic clutch 10 is not higher than the predetermined rotational speed (2,000 rpm) also at the time of the driving at the EV maximum vehicle speed Vev$_{max}$. FIG. 9 illustrates an example of the rotational speed Nc of the second engaging unit 12 according to the vehicle speed V for each gear position of the first transmission 20. With reference to FIG. 9, the EV maximum vehicle speed Vev$_{max}$ (km/h) in each gear position of the first transmission 20 when the rotational speed Nc is set not higher than the predetermined rotational speed (2,000 rpm) is obtained (FIG. 10). The EV maximum vehicle speed Vev$_{max}$ (km/h) is the vehicle speed when the rotational speed Nc is equal to the predetermined rotational speed (2,000 rpm).

Herein, when the engine is started during the EV driving, the rotational speed Nc of the second engaging unit 12 during the EV driving becomes the same rotational speed as the engine speed (rotational speed of the first engaging unit 11) after the engine is started. Therefore, it may be said that the EV maximum vehicle speed Vev$_{max}$ illustrated in FIG. 10 is the EV maximum vehicle speed Vev$_{max}$ in each gear position of the first transmission 20 when the engine speed is set not higher than the predetermined speed (2,000 rpm) and the EV maximum vehicle speed $Vev_{max}$ when the engine speed after the engine is started is set to the predetermined rotational speed (2,000 rpm). In this illustration, it is determined that the EV maximum vehicle speeds $Vev_{max}$ of the first to third speeds are too low based on the EV maximum vehicle speeds $Vev_{max}$ illustrated in FIG. 10 and the fourth and fifth speeds are determined as the candidates for the target gear position of the first transmission 20.

Subsequently, combinations of the fourth and fifth-speed gear positions being the candidates for the target gear position of the first transmission 20 with the first to fourth-speed gear positions of the second transmission 30 are considered. FIG. 11 illustrates the gear ratios $G_{mg-w}$ in all the combinations. The gear ratio $G_{mg-w}$ is a calculation result obtained by using equation 2. In this illustration, a negative gear ratio $G_{mg-w}$ is obtained in the fourth-speed gear position of the second transmission 30, so that the fourth-speed gear position is eliminated from the candidates for the target gear position.

FIG. 12 illustrates the EV maximum vehicle speed $Vev_{max}$ (km/h) and the EV maximum driving force $Fev_{max}$(N) in each combination with resting first to third-speed gear positions. Herein, the motor/generator MG with the MG maximum rotational speed $Nmg_{max}$ of 10,000 (rpm) and the MG maximum torque $Tmg_{max}$ of 100 (Nm) is used. The EV maximum vehicle speed $Vev_{max}$ and the EV maximum driving force $Fev_{max}$ are calculation results obtained by using equations 1 and 3, respectively. In this illustration, it is determined that the EV maximum driving force $Fev_{max}$ is too low when the gear ratio $G_{mg-w}$ is 2.0 and 5.9 and it is determined that the EV maximum vehicle speed $Vev_{max}$ is too low when the gear ratio $G_{mg-w}$ is 35.0 and 38.9 based on the EV maximum vehicle speed $Vev_{max}$ and the EV maximum driving force $Fev_{max}$ illustrated in FIG. 12. Therefore, in this illustration, the candidates for the target gear positions of the first and second transmissions 20 and 30 are narrowed to a case in which the gear ratio $G_{mg-w}$ is 12.5 (first transmission 20: fourth-speed gear position, second transmission 30: second-speed gear position) and a case in which this is 16.4 (first transmission 20: fifth-speed gear position, second transmission 30: second-speed gear position).

The EV maximum vehicle speed $Vev_{max}$ when the gear ratio $G_{mg-w}$ is 12.5 is 91 (km/h) with reference to FIG. 12 and 56 (km/h) in the fourth-speed gear position of the first transmission 20 with reference to FIGS. 10 and 11. Therefore, in this case, the EV maximum vehicle speed $Vev_{max}$ obtained with reference to FIGS. 10 and 11 is lower, so that the EV maximum vehicle speed $Vev_{max}$ is set to 56 (km/h). The EV maximum driving force $Fev_{max}$ in this case is 4,150 (Nm) with reference to FIG. 12.

On the other hand, the EV maximum vehicle speed $Vev_{max}$ when the gear ratio $G_{mg-w}$ is 16.4 is 69 (km/h) with reference to FIGS. 12 and 72 (km/h) in the fifth-speed gear position of the first transmission 20 with reference to FIGS. 10 and 11. Therefore, in this case, the EV maximum vehicle speed $Vev_{max}$ obtained with reference to FIG. 12 is lower, so that the EV maximum vehicle speed $Vev_{max}$ is set to 69 (km/h). The EV maximum driving force $Fev_{max}$ in this case is 5,450 (Nm) with reference to FIG. 12.

Herein, when the EV maximum vehicle speeds $Vev_{max}$ and the EV maximum driving forces $Fev_{max}$ are compared in terms of the two gear ratios $G_{mg-w}$, the EV maximum vehicle speed $Vev_{max}$ and the EV maximum driving force $Fev_{max}$ when the gear ratio $G_{mg-w}$ is 16.4 indicate better values than those when the gear ratio $G_{mg-w}$ is 12.5. Therefore, the fifth-speed gear position of the first transmission 20 and the second-speed gear position of the second transmission 30 when the gear ratio $G_{mg-w}$ is 16.4 are herein set as the target gear positions.

In the hybrid system 1, the EV driving is performed in each target gear position without the gear shift of the first and second transmissions 20 and 30 during the EV driving. In the hybrid system 1, when there is an engine start request according to change in accelerator position and the like, the engine ENG is started in the following manner.

Figure 13:
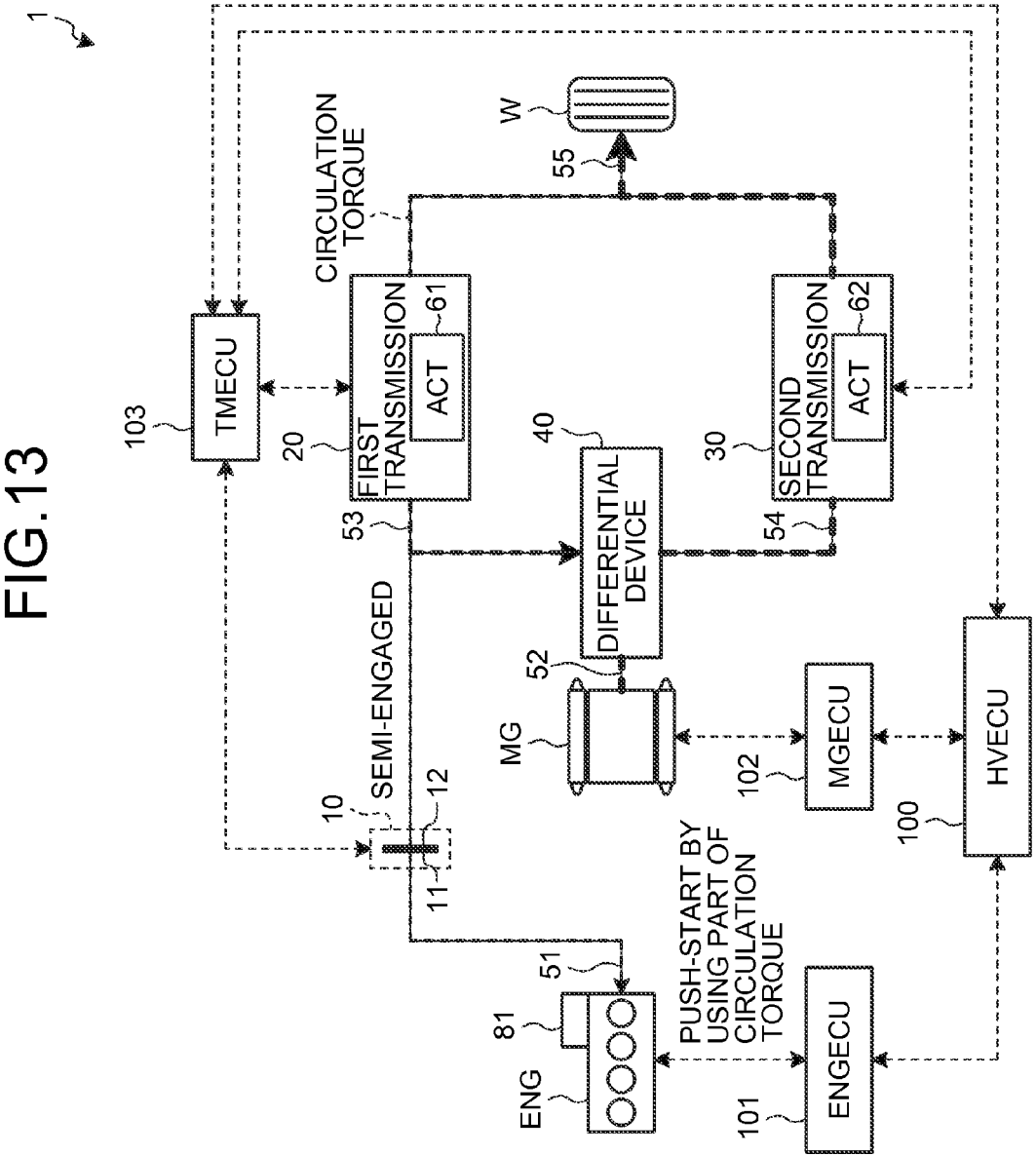
FIG. 13 is a view illustrating the power transmission path at the time of engine start control at a high vehicle speed of the embodiment.

First, when an engine start speed is not higher than the rotational speed Nc of the second engaging unit 12 of the automatic clutch 10 during the EV driving (case of high vehicle speed), the automatic clutch 10 is controlled to be in the semi-engaged state and the rotation of the second engaging unit 12 is gradually transmitted to the first engaging unit 11 with the automatic clutch 10 sliding. The engine start speed is a minimum engine speed required for starting the engine ENG. That is to say, in this case, the above-described circulation torque is generated during the EV driving, so that the engine ENG is push-started by gradually increasing the engine speed while sliding the automatic clutch 10 by using a part of the circulation torque. FIG. 13 illustrates the power transmission path when the engine is started during the EV driving.

At that time, a part of the circulation torque, in other words, a part of the motor torque is used for increasing the engine speed. Therefore, in the hybrid system 1, the motor torque is increased by an amount corresponding to the torque used for increasing the engine speed (that is to say, decreased amount of the driving torque) such that the driving torque transmitted to the driving wheel W is not decreased by start control of the engine ENG when the engine is started during the EV driving. According to this, the hybrid system 1 can inhibit the torque loss in the driving wheel W when the engine is started during the EV driving, so that this can start the engine ENG without shock and deceleration generated in the vehicle. Since the engine start during the EV driving is executed when the driver performs acceleration operation by further stepping an accelerator, for example, the driver feels uncomfortable when deceleration is generated in the vehicle even when the driver performs the acceleration operation; the hybrid system 1 can avoid this. That is to say, in the hybrid system 1, the circulation torque is generated during the EV driving and the speed of the engine ENG is raised by using a part of the circulation torque, so that it is possible to compensate the torque loss in the driving wheel W by the motor torque and it is possible to inhibit the generation of the shock and the deceleration when the engine is started during the EV driving. Therefore, the hybrid system 1 can start the engine during the EV driving without making the driver to feel deterioration in drivability.

Meanwhile, the automatic clutch 10 is preferably semi-engaged as described above for inhibiting the generation of the shock as far as possible when the engine is started, but this may also be fully engaged. In the hybrid system 1, even when the automatic clutch 10 is rapidly fully engaged, the driving torque is kept constant by rapid increase in the motor torque along with this, so that the generation of the shock by the torque loss can be inhibited.

Herein, when the engine is started, torque variation might be generated in the engine ENG by the start of the engine ENG and this might be transmitted to the driving wheel W to cause variation of the driving torque of the driving wheel W. Therefore, in the hybrid system 1, it is desirable to cancel out the variation of the driving torque of the driving wheel W by increase and decrease in the motor torque, thereby preventing the generation of the shock in the vehicle.

Figure 14:
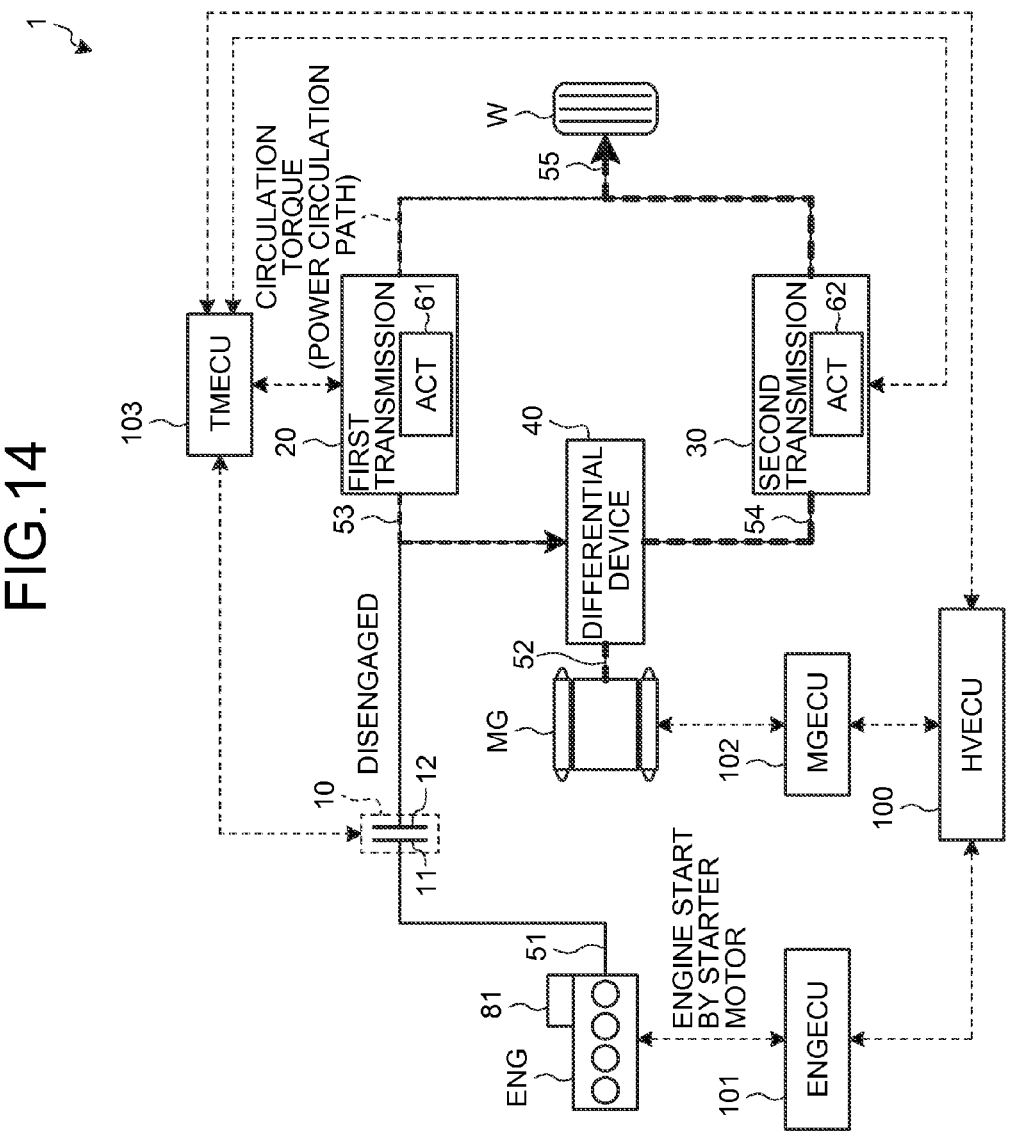
FIG. 14 is a view illustrating the power transmission path at the time of the engine start control at a low vehicle speed of the embodiment.

On the other hand, when the engine start speed is higher than the rotational speed Nc of the second engaging unit 12 of the automatic clutch 10 during the EV driving (case of lower vehicle speed than the above-described high vehicle speed), the engine ENG cannot be push-started, so that the engine ENG is started by using a starter motor 81. In this case, the engine ENG is started with the automatic clutch 10 kept disengaged, so that the engine torque is not transmitted to the driving wheel W and the generation of the shock of the vehicle in association with the engine start can be inhibited. FIG. 14 illustrates the power transmission path when the engine is started during the EV driving in this case.

In this manner, in the hybrid system 1, the electrical power is not used for raising the engine speed except the low vehicle speed case in which the push-start cannot be performed. Therefore, the hybrid system 1 can decrease a power consumption amount when starting the engine ENG.

When the engine is started at the high vehicle speed described above, after the engine is started, the engine speed becomes higher than the rotational speed Nc of the second engaging unit 12 of the automatic clutch 10 and the engine torque is transmitted to the second engaging unit 12. In the engine start control in this illustration, the automatic clutch 10 is controlled to be kept in the semi-engaged state until the power transmission path to the driving wheel W through the second transmission 30 is switched to that through the first transmission 20. At the time of the engine start at the low vehicle speed described above, the automatic clutch 10 is controlled to be in the semi-engaged state after the engine is started.

Figure 15:
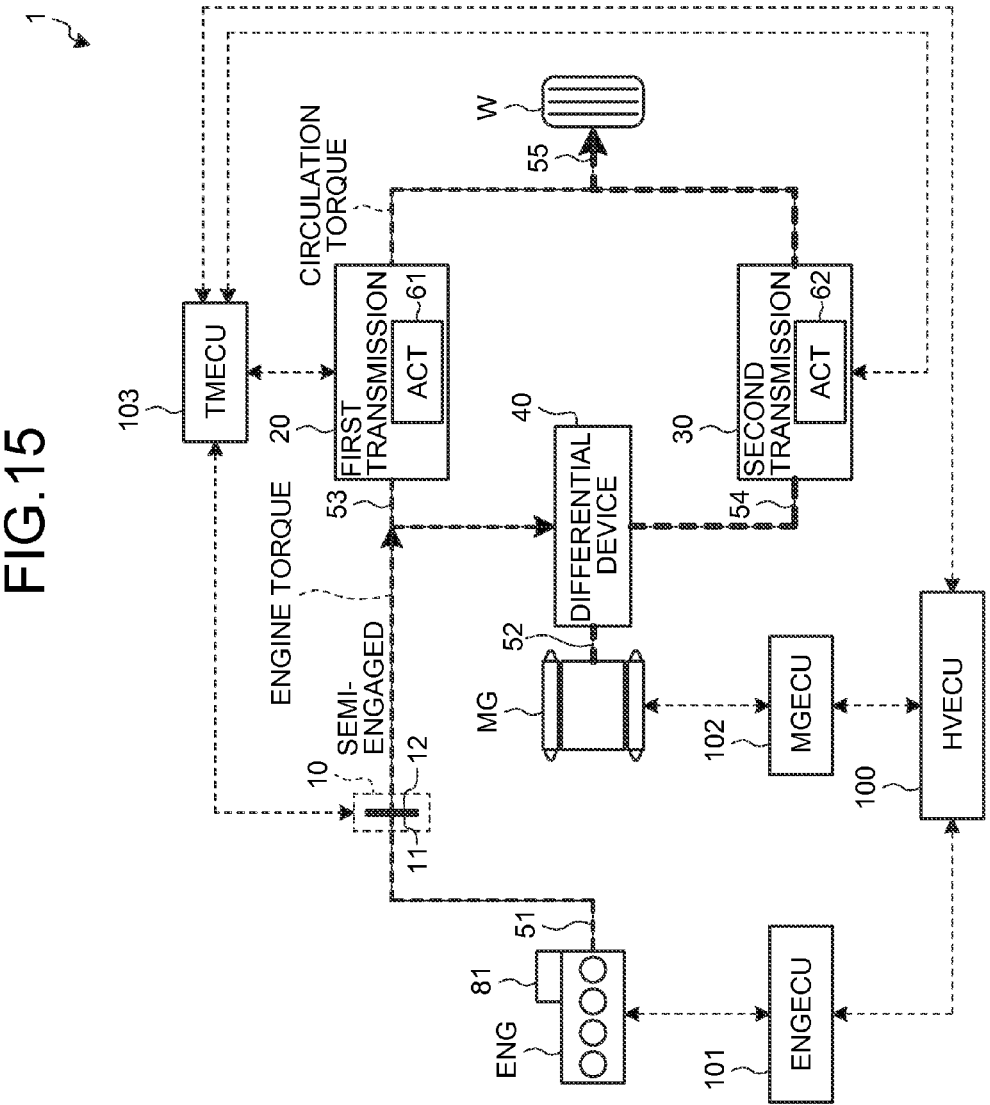
FIG. 15 is a view illustrating the power transmission path in a process to replace circulation torque with engine torque of the embodiment.
Figure 16:
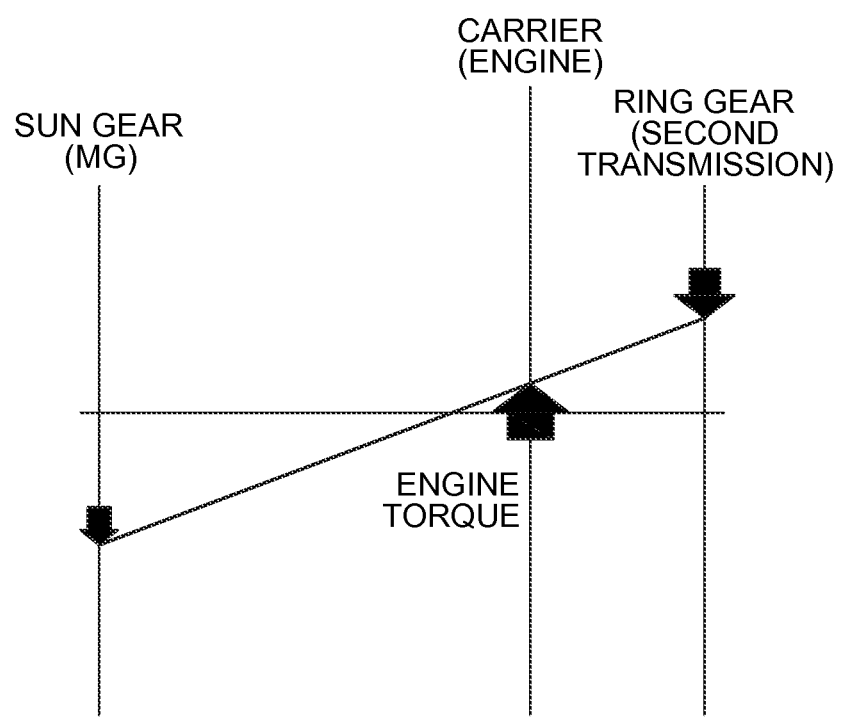
FIG. 16 is a view illustrating an alignment chart of the differential device after the circulation torque is replaced with the engine torque of the embodiment.

In the hybrid system 1, regardless of an engine start mode, the engine torque is transmitted to the rotary shaft 53 of the first transmission 20 and the carrier C of the differential device 40 through the automatic clutch 10 in the semi-engaged state, so that the circulation torque is replaced with the engine torque. At that time, in the hybrid system 1, the driving torque of the driving wheel W increases along with the decrease in the circulation torque, so that the motor torque is decreased by an amount corresponding to the increased driving torque such that the increase is inhibited and the driving torque is kept constant. Therefore, the hybrid system 1 can inhibit the generation of the shock of the vehicle. FIG. 15 illustrates the power transmission path during the replacement. FIG. 16 is an alignment chart after the replacement.

Figure 17:
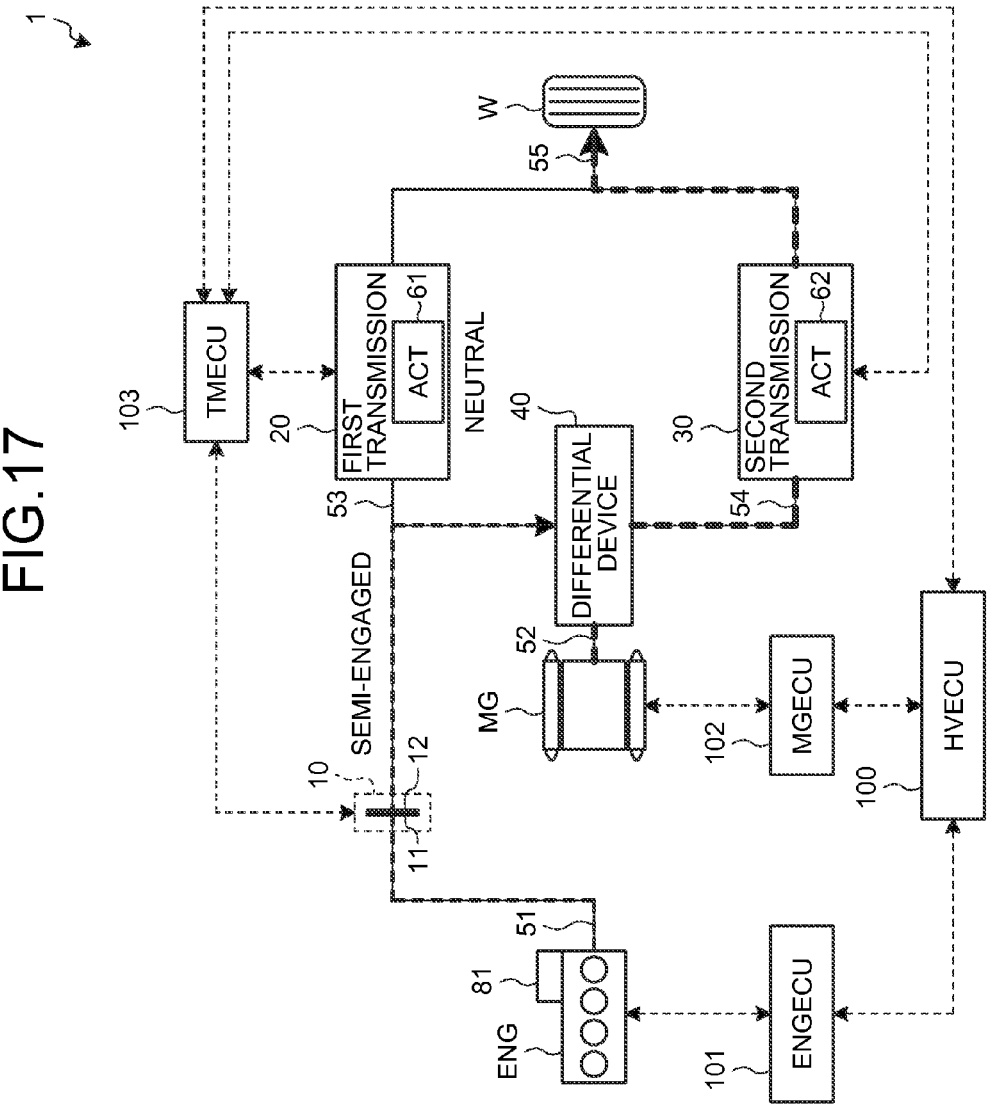
FIG. 17 is a view illustrating the power transmission path after the circulation torque is replaced with the engine torque of the embodiment.

As the circulation torque is replaced with the engine torque, this is gradually decreased to eventually reach zero. In the hybrid system 1, when the circulation torque reaches 0, the first transmission 20 is controlled to be in the neutral state. At that time, the driving torque of the driving wheel W is kept unchanged. FIG. 17 illustrates the power transmission path at that time.

Figure 18:
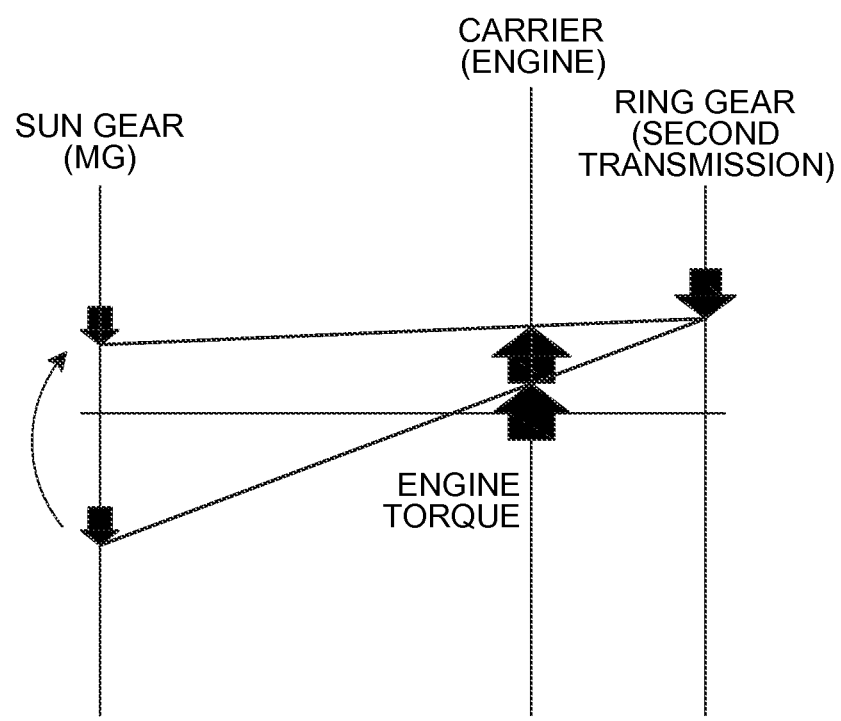
FIG. 18 is a view illustrating an alignment chart of the differential device regarding engine speed control for inhibiting shock of the embodiment.

In the hybrid system 1, the speed of the engine ENG can be freely changed in this state. Herein, in this illustration, the first transmission 20 is shifted from the target gear position in the EV driving mode into a new target gear position in the engine driving mode. Therefore, the first transmission 20 is shifted later from the current neutral state into the new target gear position. Therefore, in the hybrid system 1, the engine speed is controlled such that the rotational speed of the rotary shaft 53 being the input shaft is synchronized with a rotational speed of the rotary shaft 55 being the output shaft according to the target gear position in the engine driving mode of the first transmission 20 in order to inhibit the generation of the shock of the vehicle due to rotational difference between the input and output shafts (between the rotary shaft 53 and the rotary shaft 55) of the first transmission 20 at the time of the gear shift. Meanwhile, a target engine speed at that time may be set based on the rotational speed Nc of the rotary shaft 53 of the first transmission 20 obtained from FIG. 9, for example. FIG. 18 is an alignment chart of a state before and after the control of the engine speed. As is understood from the alignment chart, the engine speed is controlled by the control of the rotational speed of the motor/generator MG.

Figure 19:
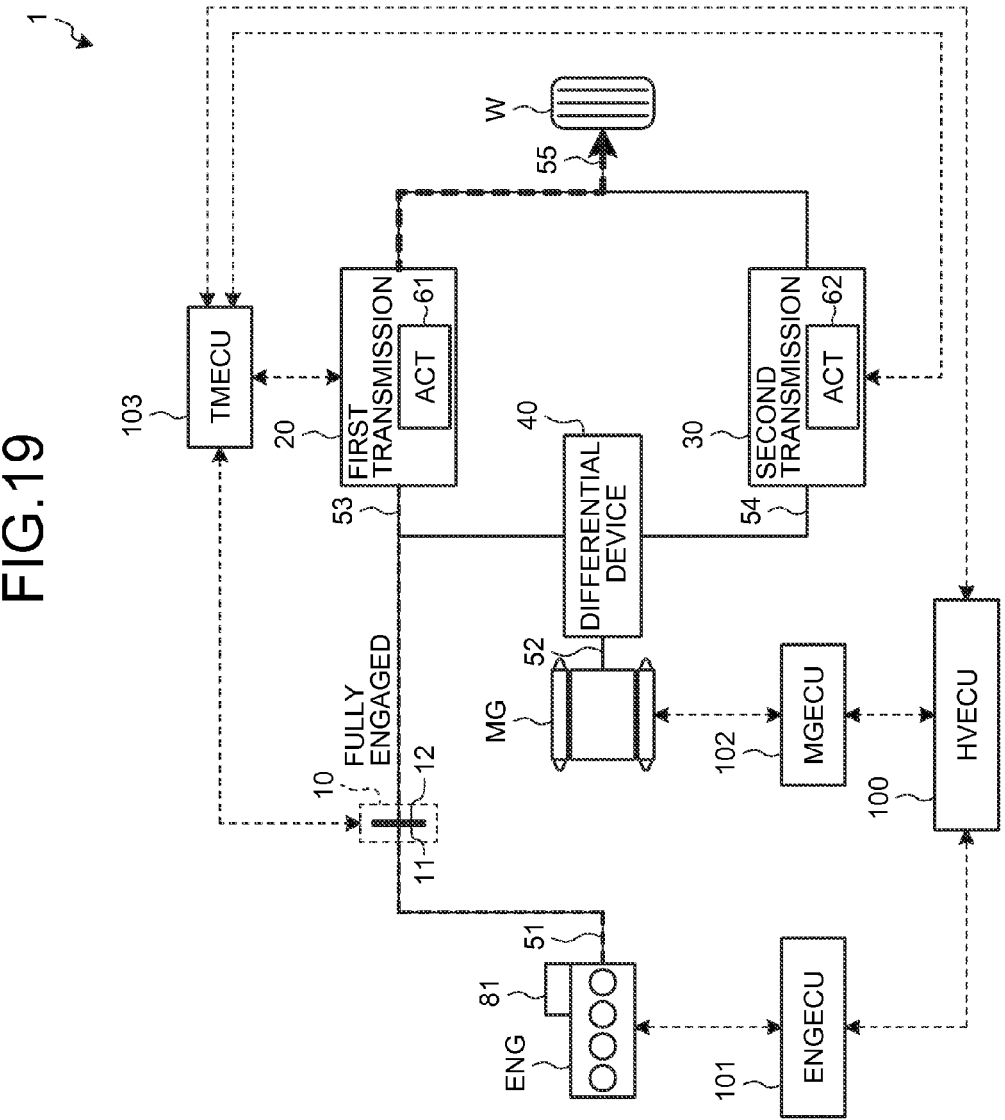
FIG. 19 is a view illustrating the power transmission path at the time of engine driving of the embodiment.
Figure 20:
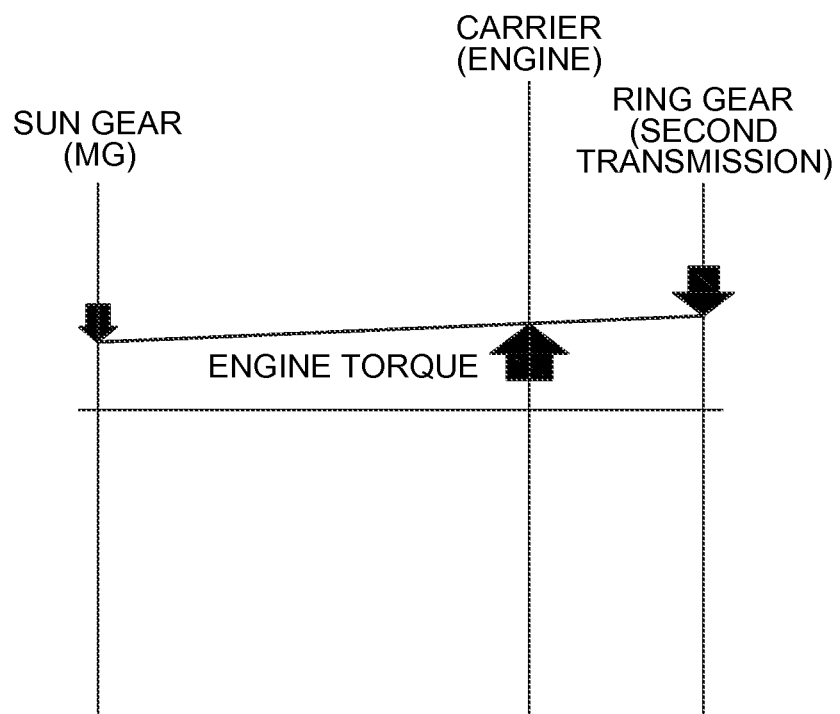
FIG. 20 is a view illustrating an alignment chart of the differential device before the power transmission path is switched of the embodiment.
Figure 21:
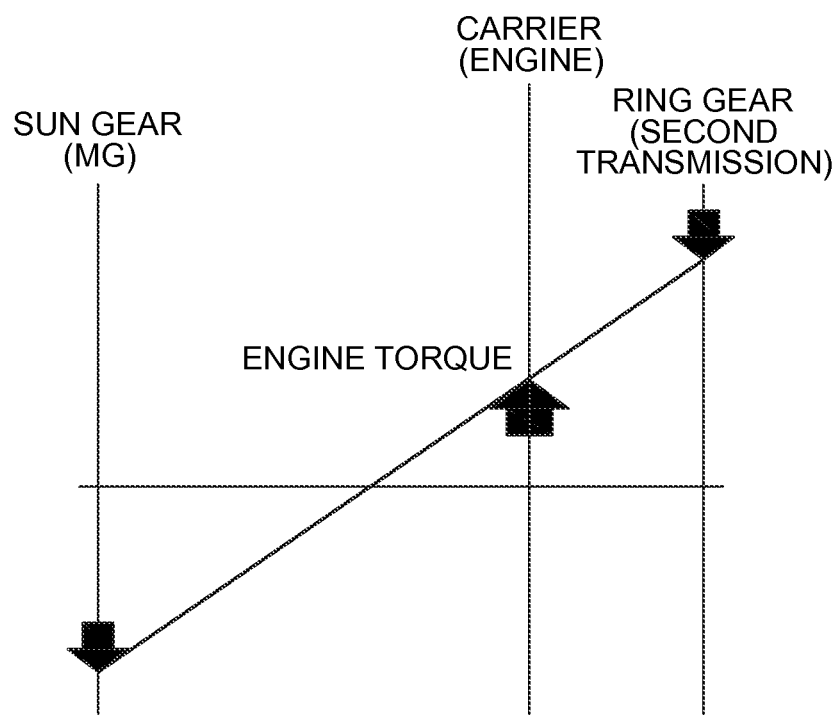
FIG. 21 is a view illustrating an alignment chart of the differential device before the power transmission path is switched of the embodiment.

In the hybrid system 1, after synchronization control of the rotational speed is finished, the first transmission 20 is shifted into the new target gear position and the automatic clutch 10 is fully engaged, and further the motor/generator MG is prevented from bearing the reaction force of the engine torque, thereby the power transmission path to the driving wheel W through the second transmission 30 is switched to the power transmission path through the first transmission 20. FIG. 19 illustrates the power transmission path after the switch. At the time of the switch, if the motor/generator MG before the switch performs the regeneration driving (FIG. 20), when the motor/generator MG does not bear the reaction force of the engine torque, the driving torque of the driving wheel W is increased, so that the engine torque is decreased by the amount corresponding to the increased driving torque such that the increase is inhibited and the driving torque is kept constant. On the other hand, if the motor/generator MG before the switch performs the power running driving (FIG. 21), contrary to the case of the regeneration driving, when the motor/generator MG does not bear the reaction force of the engine torque, the driving torque of the driving wheel W is decreased, so that the engine torque is increase by the amount corresponding to the decreased driving torque such that the decrease is inhibited and the driving torque is kept constant. In this manner, in the hybrid system 1, the driving torque can be kept constant also when the power transmission path is switched, so that the generation of the shock of the vehicle is inhibited.

As described above, the hybrid system 1 can inhibit the generation of the shock of the vehicle when the engine is started during the EV driving.

[Variation]

Although the hybrid system 1 of the above-described embodiment is illustrated as including the first and second transmissions 20 and 30, the first and second transmissions 20 and 30 may be replaced with odd-numbered gears and even-numbered gears in a so-called dual clutch transmission (DCT).

Figure 22:
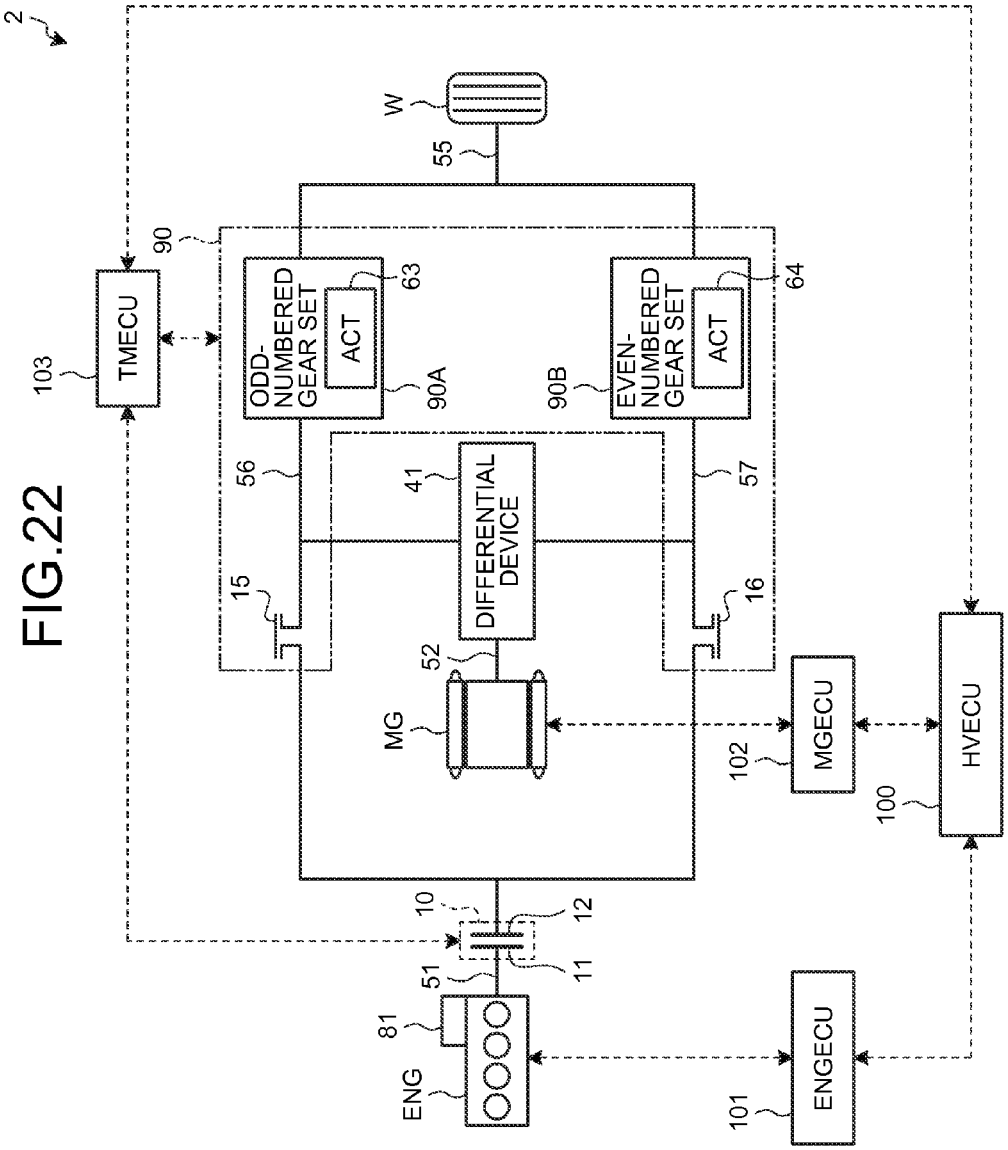
FIG. 22 is a view illustrating a configuration of a variation of a control device of a hybrid system according to the present invention and the hybrid system to which this is applied.
Figure 23:
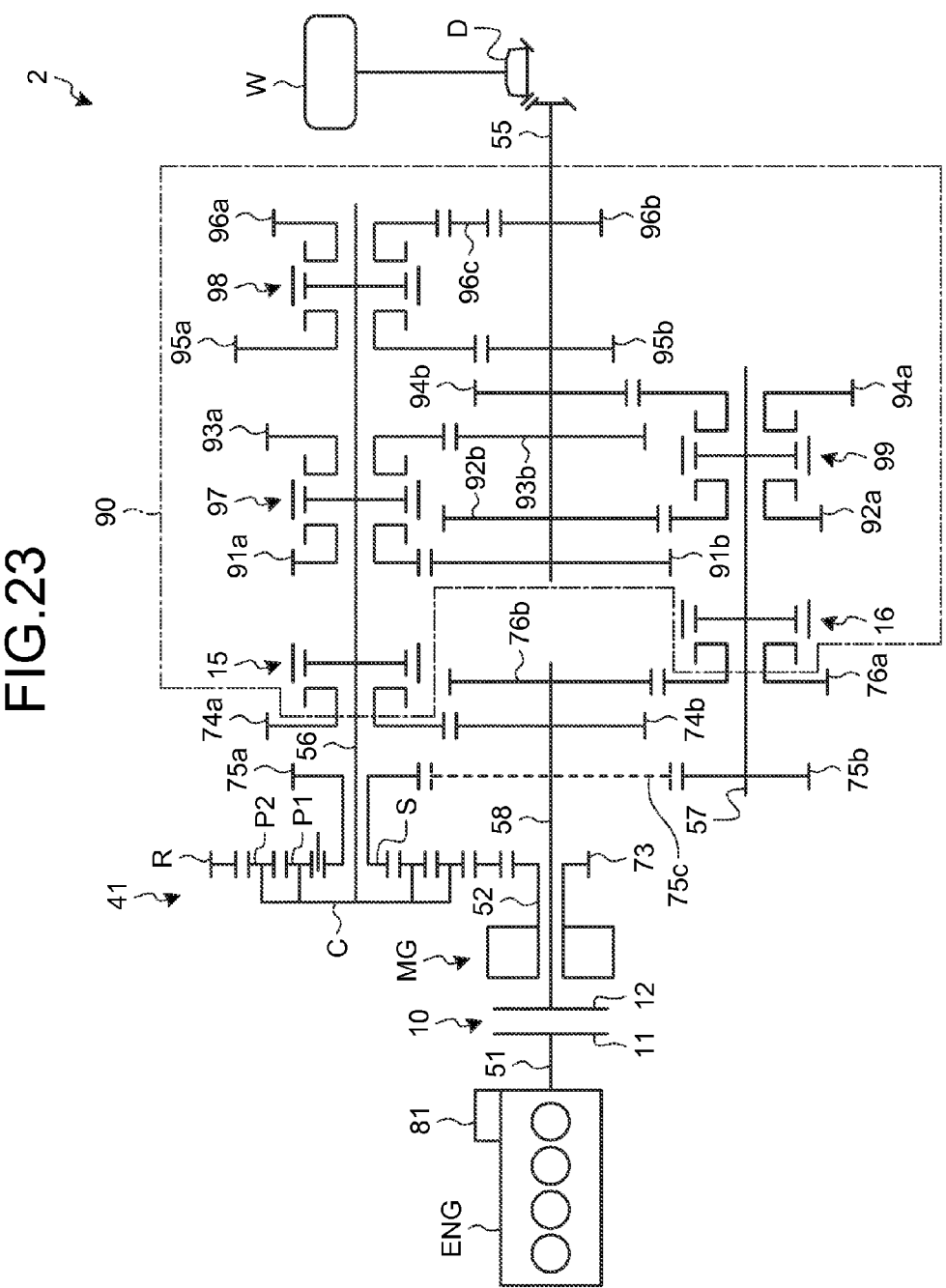
FIG. 23 is a view illustrating an example of a specific configuration of the hybrid system of the variation.

FIGS. 22 and 23 illustrate such a hybrid system 2. FIG. 22 is a simplified diagram of a configuration of the hybrid system 2 of this variation. FIG. 23 illustrates a specific example of the hybrid system 2 of this variation. A component to which the same reference sign as that of the hybrid system 1 of the above-described embodiment is assigned in FIGS. 22 and 23 represents the same component as that described in the hybrid system 1 unless especially referred to in the following.

A dual clutch transmission 90 of the hybrid system 2 is provided with an odd-numbered gear set 90A as a first transmission and an even-numbered gear set 90B as a second transmission. The odd-numbered gear set 90A in this illustration includes first, third, and fifth-speed forward gear positions and a reverse gear. Drive gears 91a, 93a, and 95a for the first, third, and fifth speeds and a reverse drive gear 96a are attached to a rotary shaft 56 being an input shaft of engine torque and the like (FIG. 23). Driven gears 91b, 93b, and 95b for the first, third, and fifth speeds and a reverse driven gear 96b are attached to an output shaft 55. A reverse intermediate gear 96c is interposed between the reverse drive gear 96a and the reverse driven gear 96b. Furthermore, a first transmission control unit 97 which selects the first speed or the third speed as a used gear position and a second transmission control unit 98 which selects the fifth speed or the reverse gear as the used gear position are provided on the rotary shaft 56.

A transmission ECU 103 appropriately moves a sleeve of the first or second transmission control unit 97 or 98 according to a target gear position of the odd-numbered gear set 90A by an actuator 63 to fully engage or disengage meshing clutches of the first and second transmission control units 97 and 98 according to the target gear position, thereby shifting into the target gear position. The transmission ECU 103 controls the actuator 63 to move the sleeve so as to disengage the meshing clutches of the first and second transmission control units 97 and 98, thereby putting the odd-numbered gear set 90A into a neutral state.

On the other hand, the even-numbered gear set 90B includes second and fourth-speed forward gear positions. Drive gears 92a and 94a for the second and fourth speeds are attached to a rotary shaft 57 being an input shaft of the engine torque and the like (FIG. 23). Driven gears 92b and 94b for the second and fourth speeds are attached to the output shaft 55. Furthermore, a third transmission control unit 99 which selects the second speed or the fourth speed as the used gear position is provided on the rotary shaft 57.

The transmission ECU 103 appropriately moves the sleeve of the third transmission control unit 99 according to the target gear position of the even-numbered gear set 90B by an actuator 64 to fully engage the meshing clutch of the third transmission control unit 99 according to the target gear position, thereby shifting into the target gear position. The transmission ECU 103 controls the actuator 64 to move the sleeve so as to disengage the meshing clutch of the third transmission control unit 99, thereby putting the even-numbered gear set 90B into the neutral state.

A differential device 41 of the hybrid system 2 is provided with a plurality of rotational elements engaging with each other in which differential operation is performed between the rotational elements as in the case of the differential device 40 in the embodiment. The differential device 41 of this illustration includes a double-pinion planetary gear mechanism.

In this illustration, a ring gear R is connected to a MG rotary shaft 52. Herein, a gear 73 provided on the MG rotary shaft 52 is meshed with an external-tooth gear provided on the ring gear R, thereby the ring gear R is connected to the MG rotary shaft 52. A carrier C which holds pinion gears P1 and P2 is connected to the rotary shaft 56 of the odd-numbered gear set 90A and is connected to a second engaging unit 12 of an automatic clutch 10 through a first dog clutch 15 and a gear pair (gears 74a and 74b). A sun gear S is connected to the rotary shaft 57 of the even-numbered gear set 90B through a gear group (gears 75a, 75b, and 75c) and is connected to the second engaging unit 12 of the automatic clutch 10 through the rotary shaft 57, a second dog clutch 16, and a gear pair (gears 76a and 76b).

Herein, the gear 75a integrally rotates coaxially with the sun gear S. The gear 75b integrally rotates coaxially with the rotary shaft 57. The gear 75c meshes with the two gears 75a and 75b. The gear 75c is a so-called counter gear configured to rotate the rotary shaft 57 in the same direction as the rotary shaft 56 by rotating in a direction opposite to a rotational direction of the sun gear S. The gear 74b and the gear 76b are connected to the second engaging unit 12 through a rotary shaft 58.

The first dog clutch 15 with one engaging unit attached to the rotary shaft 56 and the other engaging unit attached to the gear 74a enables torque transmission between the rotary shaft 56 and the second engaging unit 12 of the automatic clutch 10 by engaging the engaging units with each other. The second dog clutch 16 with one engaging unit attached to the rotary shaft 57 and the other engaging unit attached to the gear 76a enables the torque transmission between the rotary shaft 57 and the second engaging unit 12 of the automatic clutch 10 by engaging the engaging units with each other.

Figure 24:
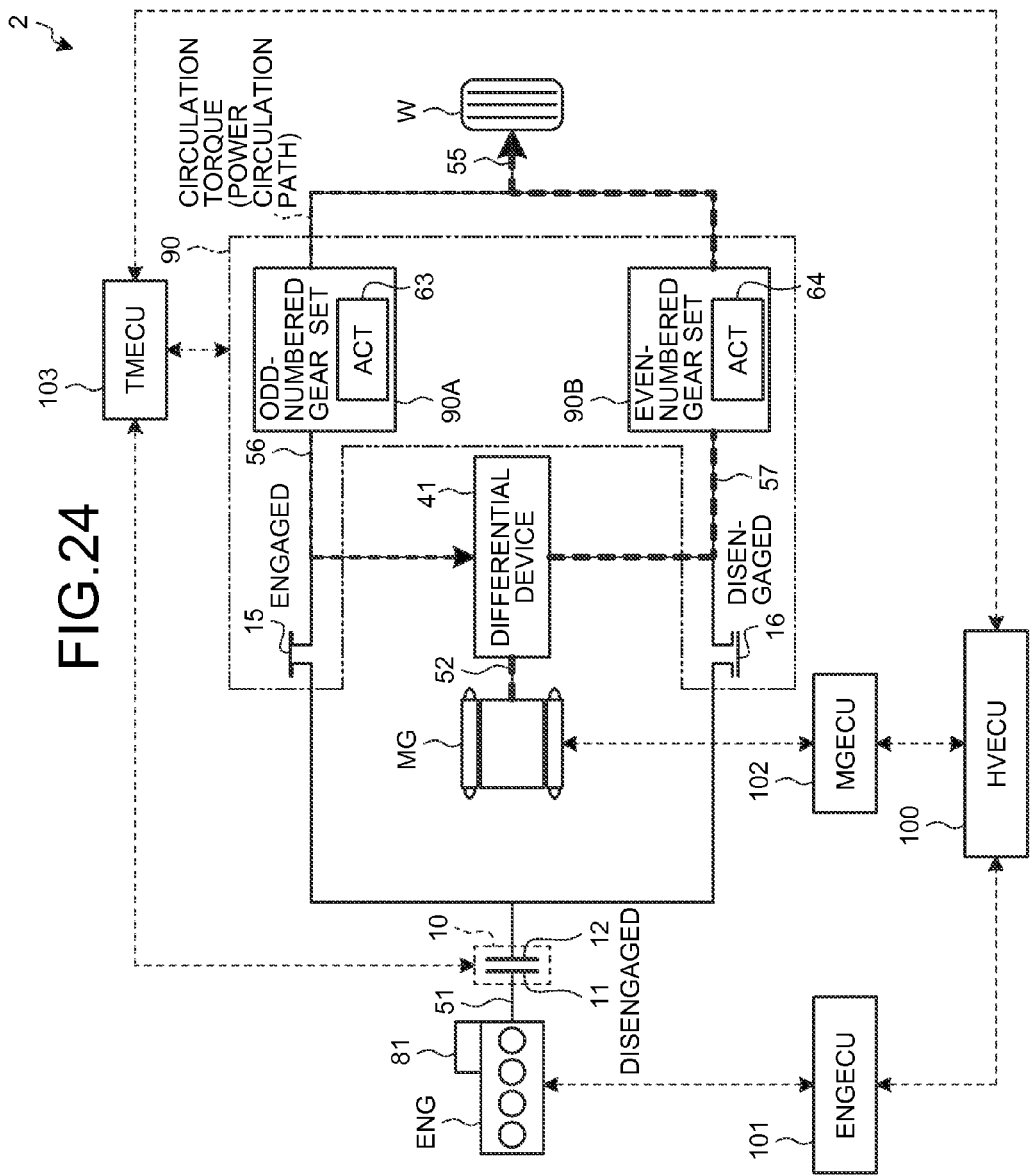
FIG. 24 is a view illustrating a power transmission path at the time of EV driving of the variation.

In the hybrid system 2 also, the automatic clutch 10 is disengaged and the odd-numbered gear set 90A and the even-numbered gear set 90B being the first and second transmissions are shifted into the target gear positions when EV driving is performed. At that time, the second dog clutch 16 is disengaged while the first dog clutch 15 is engaged. The hybrid system 2 also allows a motor/generator MG to output negative motor torque, thereby generating torque in a positive direction (vehicle forward movement direction) in a driving wheel W. FIGS. 24 and 25 illustrate a power transmission path and an alignment chart, respectively, during the EV driving when the target gear position of the odd-numbered gear set 90A is on a higher-gear side than the target gear position of the even-numbered gear set 90B. Torque in a negative direction in the sun gear S is reversed by the gear group (gears 75a, 75b, and 75c) to be decelerated by the target gear position of the even-numbered gear set 90B and a part thereof is accelerated by the target gear position of the odd-numbered gear set 90A, then the torque in the positive direction in the carrier C is generated. The torque accelerated by the odd-numbered gear set 90A is transmitted to the carrier C. In the hybrid system 2 also, power circulation is generated when such EV driving is performed. Herein also, such torque accelerated by the odd-numbered gear set 90A to return to the differential device 41 without being transmitted to the driving wheel W, that is to say, the torque being a part of the torque output from the even-numbered gear set 90B returning to the differential device 41 through the odd-numbered gear set 90A is referred to as "circulation torque".

Herein, the target gear positions of the odd-numbered gear set 90A and the even-numbered gear set 90B during the EV driving are described. In the dual clutch transmission 90 also, during the EV driving, it is desirable that the target gear positions are not changed, that is to say, gear shift of the odd-numbered gear set 90A and the even-numbered gear set 90B is not performed in order to prevent torque loss associated with the gear shift.

A manner of determining the target gear position is basically the same as that of the above-described embodiment. However, in the dual clutch transmission 90, the manner of determining is different depending on whether the target gear position of the odd-numbered gear set 90A is set on the higher-gear side or that of the even-numbered gear set 90B is set on the higher-gear side.

When the target gear position of the odd-numbered gear set 90A is on the higher-gear side than the target gear position of the even-numbered gear set 90B, the target gear position of the odd-numbered gear set 90A is set to that of a gear ratio with which a rotational speed of the second engaging unit 12 of the automatic clutch 10 is not higher than a predetermined rotational speed (engine speed) at which a driver does not feel racing of an engine ENG also when the engine ENG is started at an EV maximum vehicle speed $Vev_{max}$. The target gear position of the even-numbered gear set 90B is set to that of the gear ratio which realizes a gear $G_{mg-w}$ realizing target values of the EV maximum vehicle speed $Vev_{max}$ and EV maximum driving force $Fev_{max}$. The target values may be determined as in the case of the embodiment. The gear ratio $G_{mg-w}$ in this case can be obtained by following equation 4.

$$G_{mg-w}=G_{mg-R}/2*(G\text{-even}-G\text{-odd})*G_{diff} \quad (4)$$

"$G_{mg-R}$" represents a gear ratio between the motor/generator MG and the ring gear R of the differential device 41. "G-odd" represents a gear ratio of an object gear position (certain gear position such as the target gear position and used gear position) of the odd-numbered gear set 90A. "G-even" represents a gear ratio of an object gear position (certain gear position such as the target gear position and used gear position) of the even-numbered gear set 90B.

On the other hand, when the target gear position of the even-numbered gear set 90B is on the higher-gear side than the target gear position of the odd-numbered gear set 90A, the target gear position of the even-numbered gear set 90B is set to that of the gear ratio with which the rotational speed of the second engaging unit 12 of the automatic clutch 10 is not higher than the predetermined rotational speed (engine speed) at which the driver does not feel the racing of the engine ENG also when the engine ENG is started at the EV maximum vehicle speed $Vev_{max}$. The target gear position of the odd-numbered gear set 90A is set to that of the gear ratio which realizes the gear ratio $G_{mg-w}$ realizing the target values of the EV maximum vehicle speed $Vev_{max}$ and the EV maximum driving force $Fev_{max}$. The gear ratio $G_{mg-w}$ in this case can be obtained by following equation 5.

$$G_{mg-w}=G_{mg-R}/2*(G\text{-odd}-G\text{-even})*G_{diff} \quad (5)$$

Hereinafter, the target gear positions of the odd-numbered gear set 90A and the even-numbered gear set 90B during the EV driving are described with reference to a specific example. Meanwhile, numerical values of the gear ratio and the like herein illustrated are conventionally set for the purpose of description.

FIG. 26 illustrates an example of the gear ratios G-odd and G-even of the gear position of the dual clutch transmission 90 and the gear ratio $G_{diff}$ of a differential device D. Suppose that a gear ratio ρ of the differential device 41 is 0.5, a radius r of the driving wheel W is 0.3 (m), and the gear ratio $G_{mg-R}$ is 4. Herein also, the predetermined rotational speed at which a passenger does not feel uncomfortable about an increase in engine speed is set to 2,000 (rpm).

First, the EV maximum vehicle speed $Vev_{max}$ (km/h) in each gear position of the odd-numbered gear set 90A and the even-numbered gear set 90B when a rotational speed Nc of the second engaging unit 12 of the automatic clutch 10 is not higher than the predetermined rotational speed (2,000 rpm) is obtained. Herein, the gear ratios G-odd and G-even of each gear position of the dual clutch transmission 90 are set the same as the gear ratio G1 of the gear position of the first transmission 20 of the embodiment. The gear ratio $G_{diff}$ of the differential device D also is set the same as that of the embodiment. Therefore, the rotational speed Nc of the second engaging unit 12 according to a vehicle speed V in each gear position of the dual clutch transmission 90 is the same as the rotational speed Nc of the second engaging unit 12 according to the vehicle speed V in each gear position of the first transmission 20 (FIG. 9). Therefore, the EV maximum vehicle speed $Vev_{max}$ in each gear position herein obtained is the same vehicle speed as that described in the embodiment (FIG. 10).

In this illustration also, it is determined that the EV maximum vehicle speeds $Vev_{max}$ of the first to third speeds are too low based on the EV maximum vehicle speeds $Vev_{max}$ illustrated in FIG. 10. Therefore, candidates for the target gear position of the dual clutch transmission 90 are narrowed to the fourth-speed gear position of the even-numbered gear set 90B and the fifth-speed gear position of the odd-numbered gear set 90A. FIG. 27 illustrates the gear ratios $G_{mg-w}$ obtained based on the result, the gear ratios $G_{mg-w}$ in the combinations of the fourth-speed gear position of the even-numbered gear set 90B with the gear positions of the odd-numbered gear set 90A and the gear ratios $G_{mg-w}$ in the combinations of the fifth-speed gear position of the odd-numbered gear set 90A with the gear positions of the even-numbered gear set 90B. The gear ratios $G_{mg-w}$ are calculation results obtained by using equation 4 or 5.

In FIG. 27, the combination of the first and second-speed gear positions and the combination of the second-speed and third-speed gear positions do not include the fourth or fifth-speed gear position, so that they are eliminated from the candidates for the target gear position.

FIG. 28 illustrates the EV maximum vehicle speed $Vev_{max}$ (km/h) and the EV maximum driving force $Fev_{max}$(N) in the combinations of resting gear positions of the odd-numbered gear set 90A and even-numbered gear set 90B. Herein also, the motor/generator MG with an MG maximum rotational speed $Nmg_{max}$ of 10,000 (rpm) and MG maximum torque $Tmg_{max}$ of 100 (Nm) is used. The EV maximum vehicle speed $Vev_{max}$ and the EV maximum driving force $Fev_{max}$ are calculation results obtained by using equations 1 and 3, respectively. In this illustration, it is determined that the EV maximum driving force $Fev_{max}$ is too low when the gear ratio $G_{mg-w}$ is 1.8 and 3.6 and it is determined that the EV maximum vehicle speed $Vev_{max}$ is too low when the gear ratio $G_{mg-w}$ is 23.4 based on the EV maximum vehicle speed $Vev_{max}$ and the EV maximum driving force $Fev_{max}$ illustrated in FIG. 28. Therefore, in this illustration, a case in which the gear ratio $G_{mg-w}$ is 11.7 (odd-numbered gear set 90A: fifth-speed gear position, even-numbered gear set 90B: second-speed gear position) is set as the target gear positions of the odd-numbered gear set 90A and the even-numbered gear set 90B of the dual clutch transmission 90. Meanwhile, the EV maximum vehicle speed $Vev_{max}$ is 72 (km/h), a lower speed, according to comparison between 72 (km/h) in FIGS. 10 and 97 (km/h) in FIG. 28.

In the hybrid system 2, the EV driving is performed in the target gear positions of the odd-numbered gear set 90A and the even-numbered gear set 90B of the dual clutch transmission 90 without the gear shift during the EV driving. In the hybrid system 2, when there is an engine start request according to change in accelerator position and the like, the engine ENG is started in the following manner.

First, in the hybrid system 2, before the engine ENG is started, the first dog clutch 15 is engaged to synchronize the rotational speed Nc of the second engaging unit 12 of the automatic clutch 10 with a rotational speed of the rotary shaft 56 of the odd-numbered gear set 90A. Since the first dog clutch 15 is already engaged during the EV driving in this illustration, engine start control is performed in this state.

Figure 29:
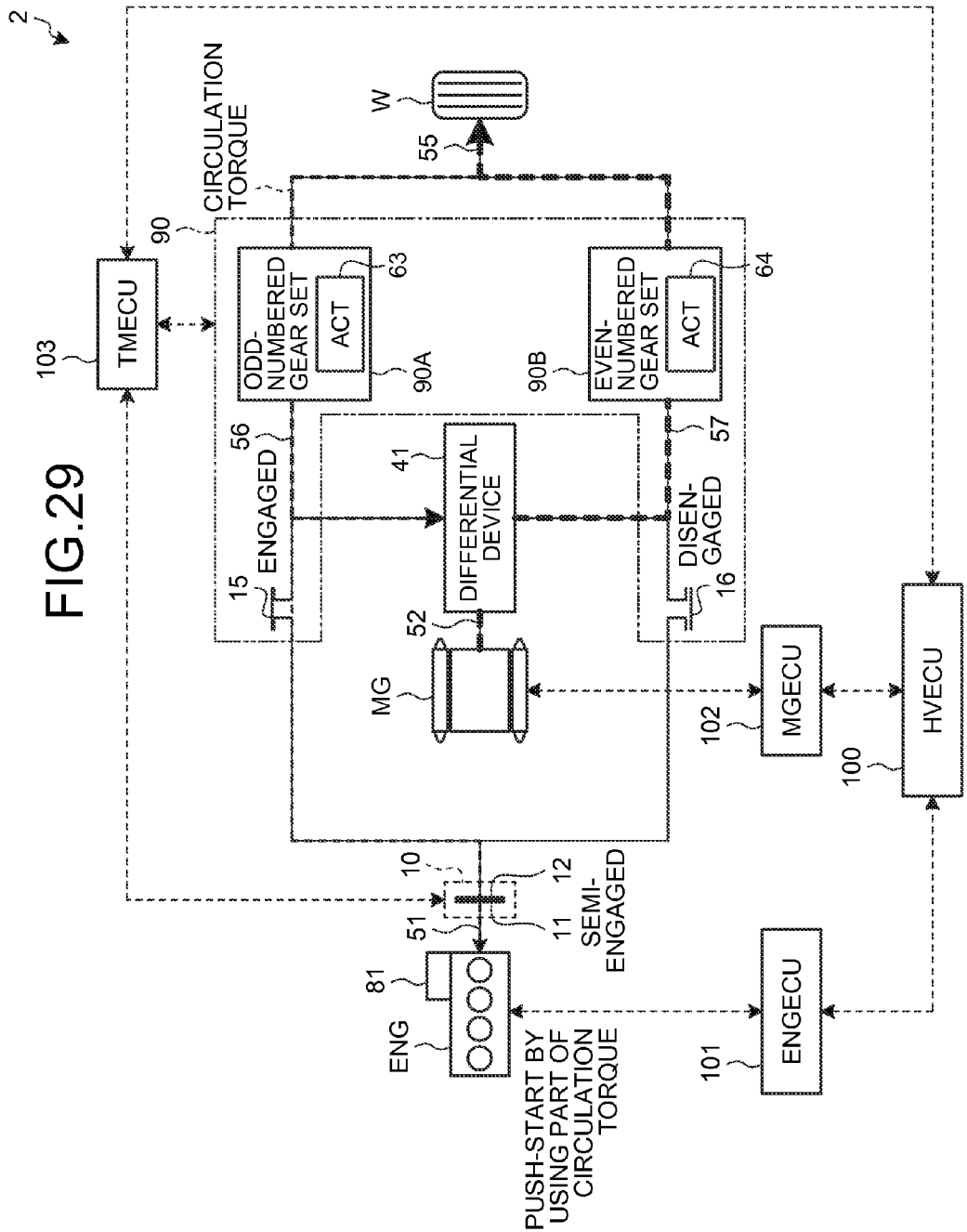
FIG. 29 is a view illustrating the power transmission path at the time of engine start control at a high vehicle speed of the variation.

The engine start control during the EV driving is basically the same as that of the above-described embodiment. Therefore, when an engine start speed is not higher than the rotational speed Nc of the second engaging unit 12 of the automatic clutch 10 during the EV driving (case of high vehicle speed), the engine ENG is push-started by gradually increasing the engine speed while sliding the automatic clutch 10 in a semi-engaged state by using a part of the circulation torque. FIG. 29 illustrates the power transmission path when the engine is started during the EV driving. At that time, a part of the circulation torque is used for increasing the engine speed, so that the motor torque is increased by an amount corresponding to the torque used for increasing the engine speed such that driving torque transmitted to the driving wheel W is not decreased by the start control of the engine ENG. Therefore, in this case, an effect similar to that of the embodiment can be obtained, so that it is possible to start the engine ENG without generation of shock and deceleration in the vehicle while inhibiting the torque loss in the driving wheel W when the engine is started during the EV driving. Therefore, in the hybrid system 2, the engine can be started during the EV driving without making the driver feel deterioration in drivability.

At the time of the engine start of the hybrid system 2 also, torque variation might be generated in the engine ENG by the start of the engine ENG and this might be transmitted to the driving wheel W to cause variation of the driving torque of the driving wheel W. Therefore, in the hybrid system 2 also, it is desirable to cancel out the variation of the driving torque of the driving wheel W by increase and decrease in the motor torque, thereby preventing the generation of the shock in the vehicle.

Figure 30:
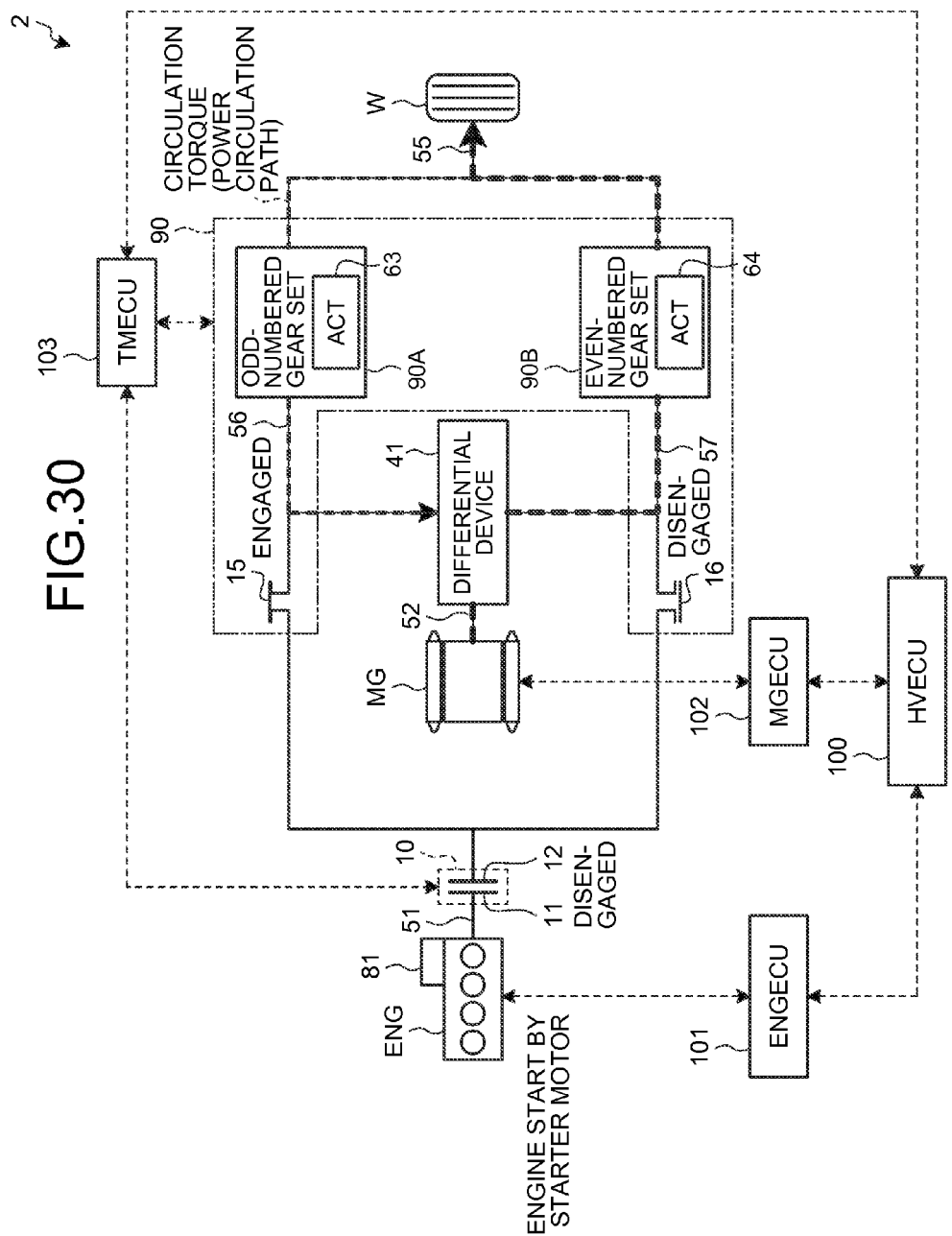
FIG. 30 is a view illustrating the power transmission path at the time of the engine start control at a low vehicle speed of the variation.

On the other hand, when the engine start speed is higher than the rotational speed Nc of the second engaging unit 12 of the automatic clutch 10 during the EV driving (case of lower vehicle speed than the above-described high vehicle speed), the engine ENG cannot be push-started, so that the engine ENG is started by using a starter motor 81 with the automatic clutch 10 kept disengaged. Therefore, in this case, the engine torque is not transmitted to the driving wheel W and the generation of the shock of the vehicle in association with the engine start can be inhibited. FIG. 30 illustrates the power transmission path when the engine is started during the EV driving in this case. In this case, the automatic clutch 10 is controlled to be in the semi-engaged state after the engine is started.

Figure 31:
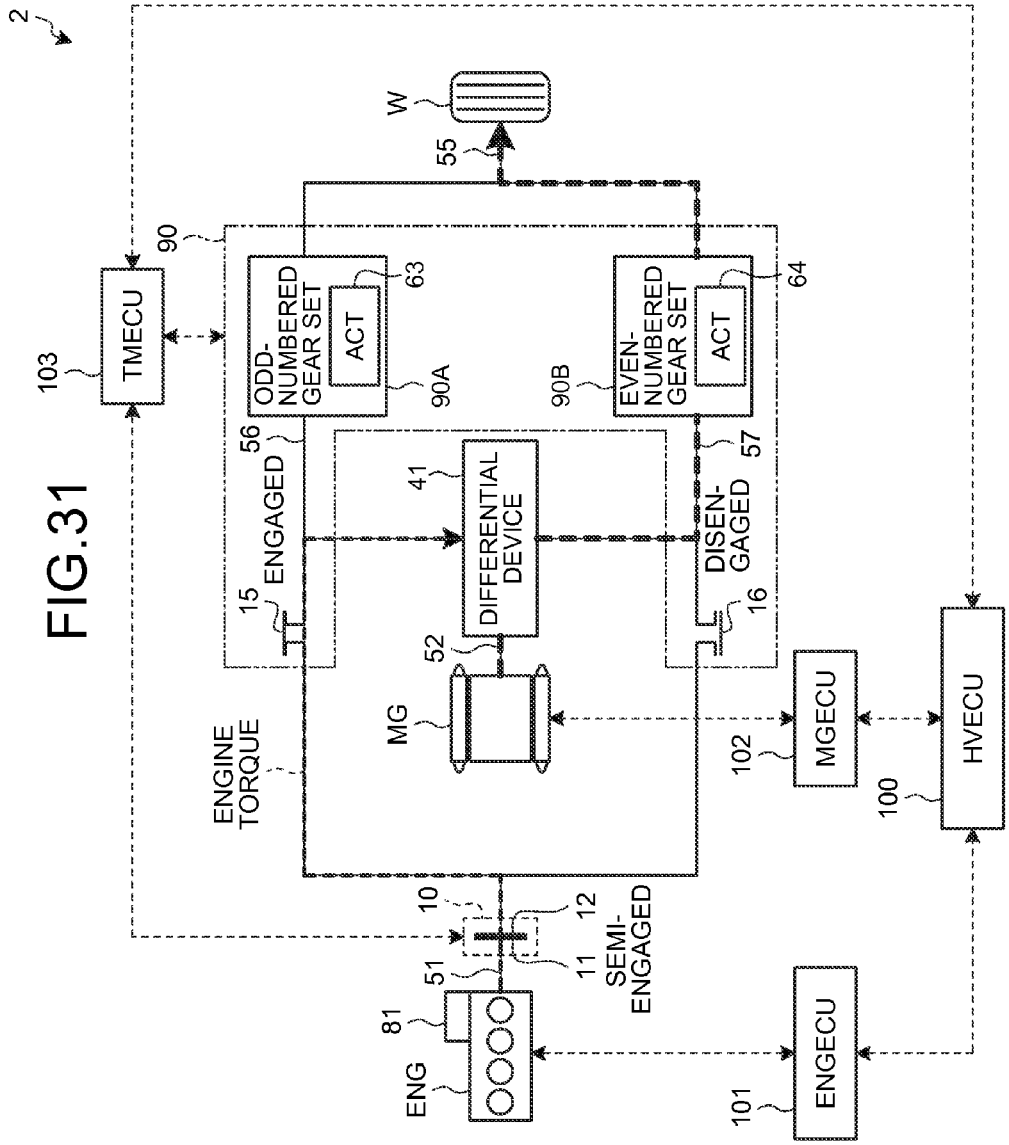
FIG. 31 is a view illustrating the power transmission path after circulation torque is replaced with engine torque of the variation.
Figure 32:
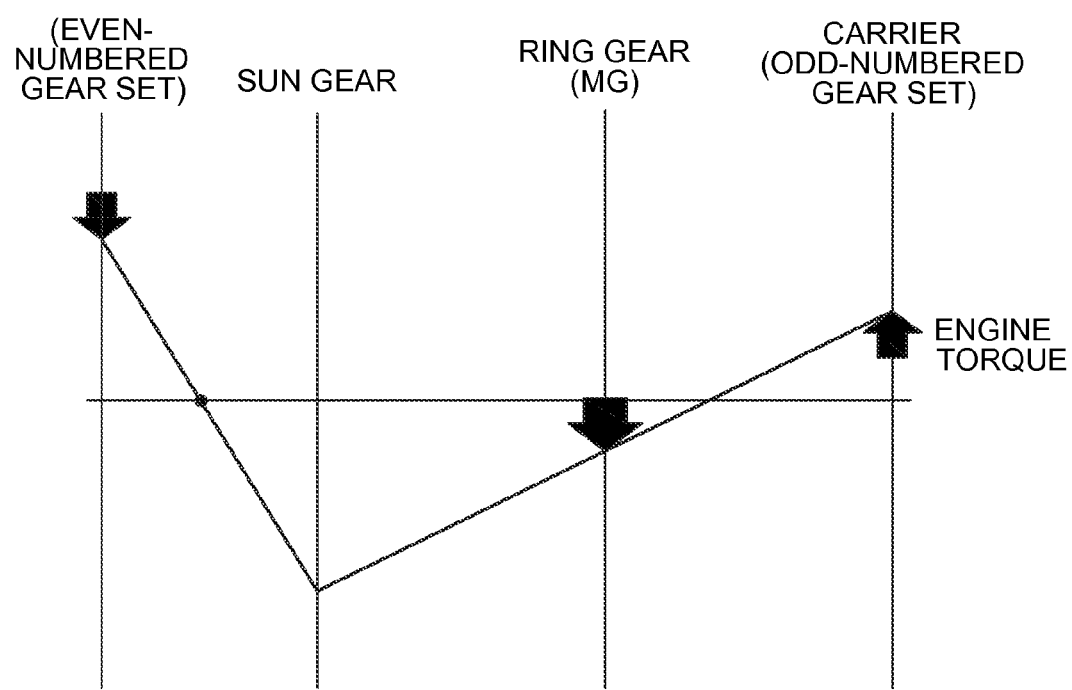
FIG. 32 is a view illustrating an alignment chart of the differential device after the circulation torque is replaced with the engine torque of the variation.

In the hybrid system 2, the engine torque is transmitted to the rotary shaft 56 of the odd-numbered gear set 90A and the carrier C of the differential device 41 through the automatic clutch 10 in the semi-engaged state, so that the circulation torque is replaced with the engine torque. At that time, in the hybrid system 2, the driving torque of the driving wheel W increases along with the decrease in the circulation torque, so that the motor torque is decreased by an amount corresponding to the increased driving torque such that the increase is inhibited and the driving torque is kept constant. Therefore, in the hybrid system 2 also, the generation of the shock of the vehicle can be inhibited. FIGS. 31 and 32 illustrate the power transmission path and an alignment chart, respectively, after the replacement.

Figure 33:
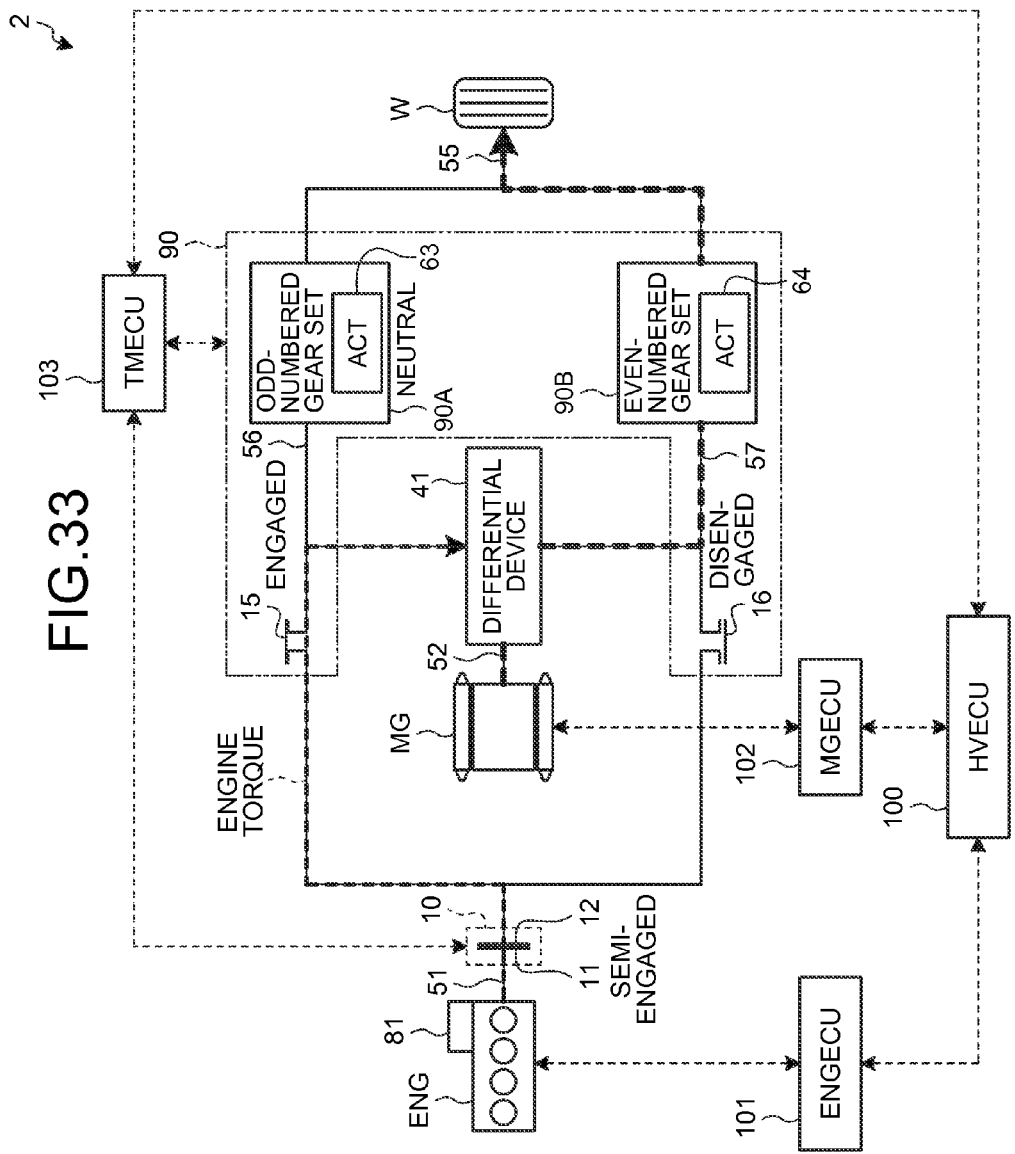
FIG. 33 is a view illustrating the power transmission path at the time of engine speed control for inhibiting shock of the variation.
Figure 34:
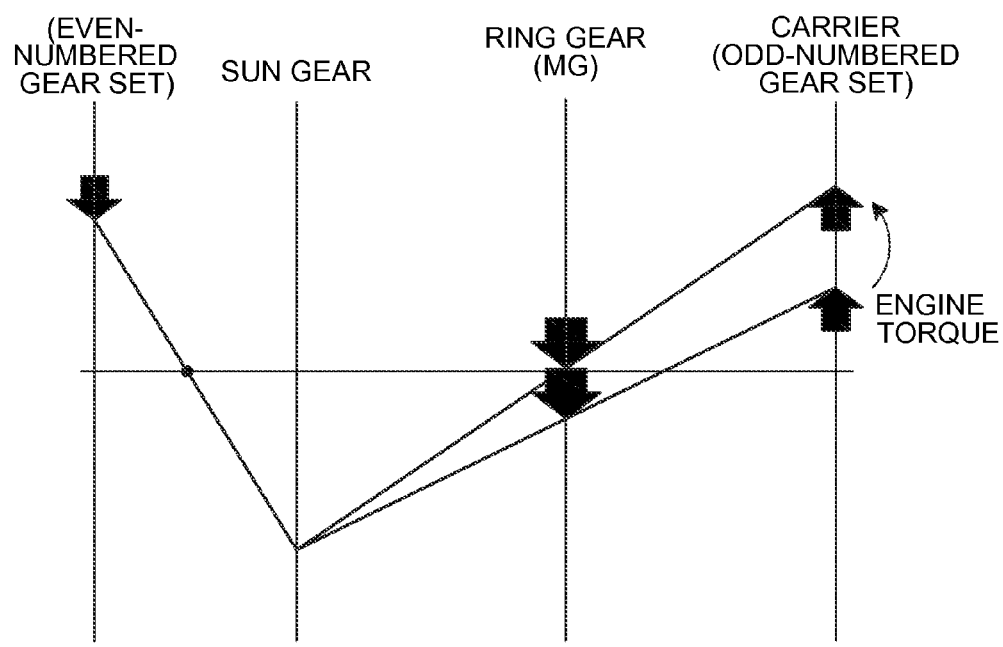
FIG. 34 is a view illustrating an alignment chart of the differential device regarding engine speed control for inhibiting the shock of the variation.

In the hybrid system 2, when the circulation torque reaches 0, the odd-numbered gear set 90A is controlled to be in the neutral state. In the hybrid system 2, the speed of the engine ENG can be freely changed in this state. FIGS. 33 and 34 illustrate the power transmission path and an alignment chart, respectively, when the engine speed is controlled.

In this illustration, the dual clutch transmission 90 is controlled to be in the target gear position in an engine driving mode. The target gear position may belong to the odd-numbered gear set 90A or to the even-numbered gear set 90B. Regarding the even-numbered gear set 90B currently held in the target gear position at the time of the EV driving, if the target gear position is the same as the target gear position in the engine driving mode, the target gear position at the time of the EV driving can be set as the target gear position when switching to the engine driving mode. On the other hand, when the gear position of the even-numbered gear set 90B different from the target gear position at the time of the EV driving is made the target gear position in the engine driving mode, it is possible to temporarily shift into the gear position of the odd-numbered gear set 90A and then switch to an actual target gear position of the even-numbered gear set 90B in the engine driving mode.

Herein, in the hybrid system 2, when the gear shift into the odd-numbered gear set 90A is performed, the shock might be generated in the vehicle due to rotational difference between the input and output shafts of the odd-numbered gear set 90A (between the rotary shaft 56 and the rotary shaft 55). Therefore, in the hybrid system 2, the engine speed is controlled such that the rotational speed of the rotary shaft 56 being the input shaft is synchronized with the rotational speed of a rotary shaft 55 being the output shaft according to a target gear ratio of the odd-numbered gear set 90A in order to inhibit the generation of the shock in the vehicle.

Figure 35:
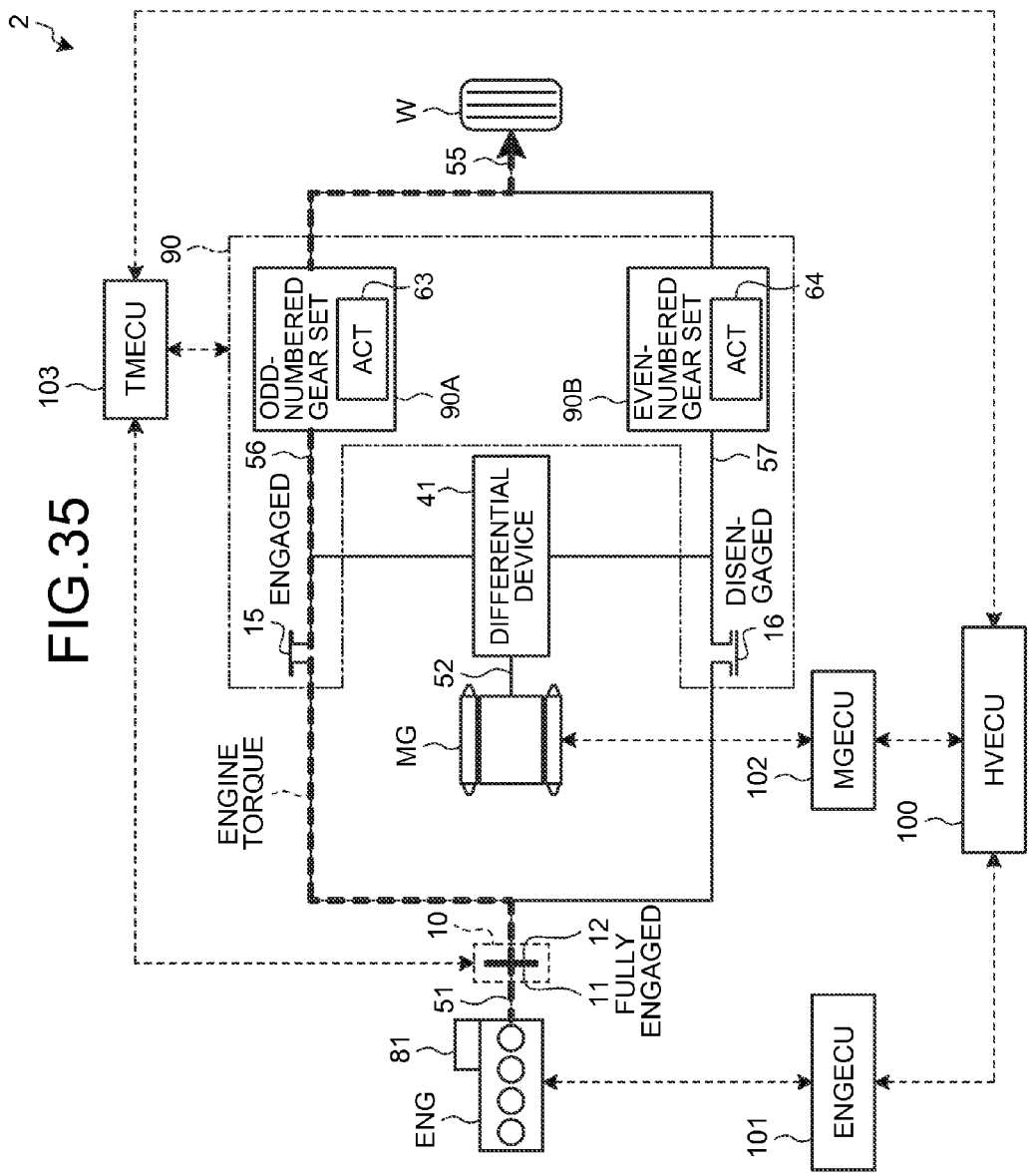
FIG. 35 is a view illustrating the power transmission path after switch of the variation.

In the hybrid system 2, after synchronization control of the rotational speed is finished, the odd-numbered gear set 90A is shifted into the target gear position in the engine driving mode and the automatic clutch 10 is fully engaged, and further the motor/generator MG is prevented from bearing reaction force of the engine torque, thereby the power transmission path to the driving wheel W through the even-numbered gear set 90B is switched to the power transmission path through the odd-numbered gear set 90A. FIG. 35 illustrates the power transmission path after the switch. At the time of the switch, if the motor/generator MG before the switch performs regeneration driving, when the motor/generator MG does not bear the reaction force of the engine torque, the driving torque of the driving wheel W is increased, so that the engine torque is decreased by the amount corresponding to the increased driving torque such that the increase is inhibited and the driving torque is kept constant. On the other hand, if the motor/generator MG before the switch performs power running driving, contrary to the case of the regeneration driving, when the motor/generator MG does not bear the reaction force of the engine torque, the driving torque of the driving wheel W is decreased, so that the engine torque is increased by an amount corresponding to the decreased driving torque such that the decrease is inhibited and the driving torque is kept constant. In this manner, in the hybrid system 2, the driving torque can be kept constant also when the power transmission path is switched and the generation of the shock of the vehicle is inhibited.

Figure 36:
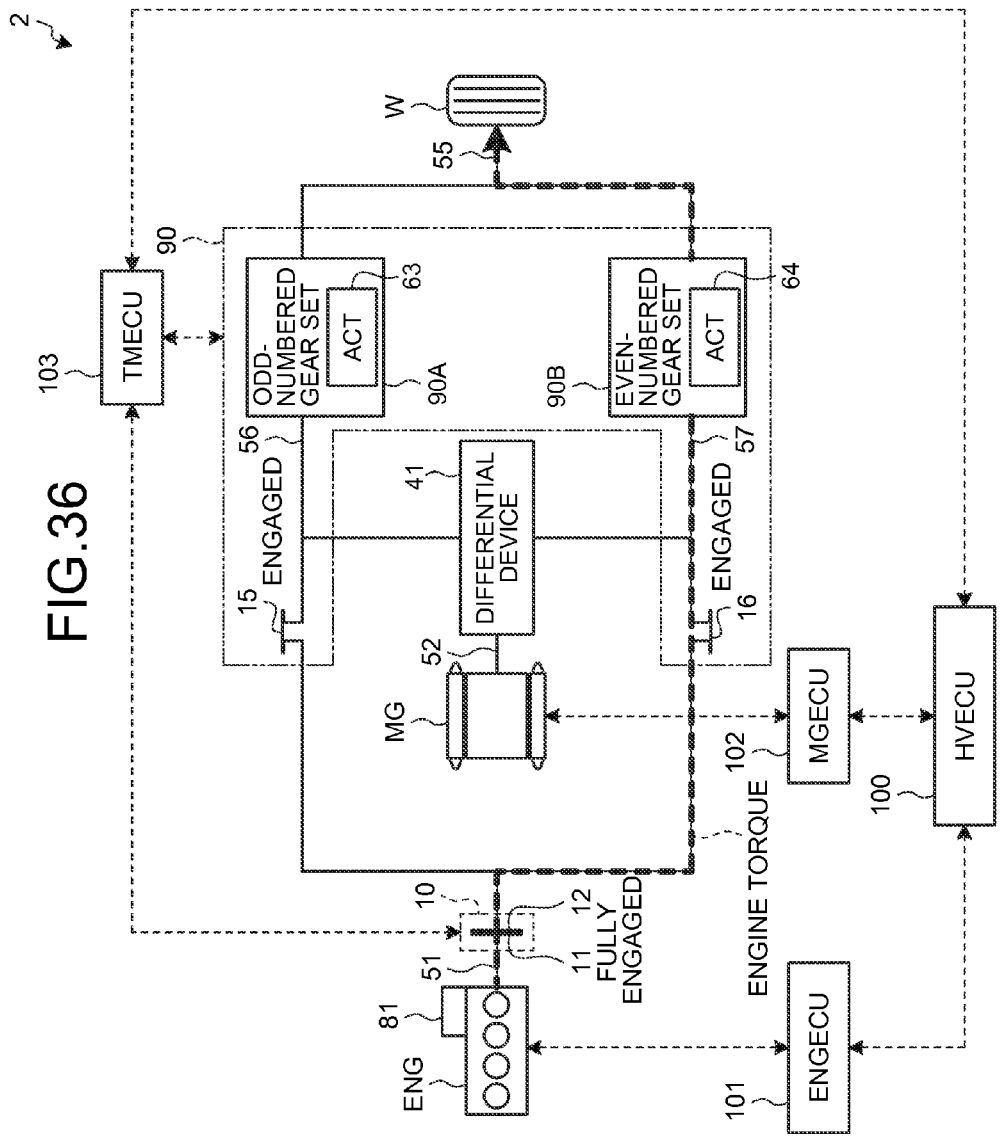
FIG. 36 is a view illustrating another power transmission path after the switch of the variation.

On the other hand, when it shifts to the engine driving mode while the target gear position of the even-numbered gear set 90B at the time of the EV driving is maintained, the shock is not generated in the vehicle, so that the control of the engine speed as in the case of the gear shift to the odd-numbered gear set 90A is not required. Therefore, in this case, the automatic clutch 10 is fully engaged and the second dog clutch 16 is engaged, and further the motor/generator MG is prevented from bearing the reaction force of the engine torque, thereby the power transmission path to the driving wheel W transmitted through the first dog clutch 15 to the odd-numbered gear set 90A is switched to the power transmission path to the even-numbered gear set 90B through the second dog clutch 16. At that time, the motor/generator MG, the rotational speed of which is 0, does not perform the power running driving or the regeneration driving. Therefore, in this case, there is no variation of the driving torque of the driving wheel W also when the motor/generator MG does not bear the reaction force of the engine torque, so that it is not required to perform increasing/decreasing control of the engine torque to cancel out the variation. FIG. 36 illustrates the power transmission path in this case.

Figure 37:
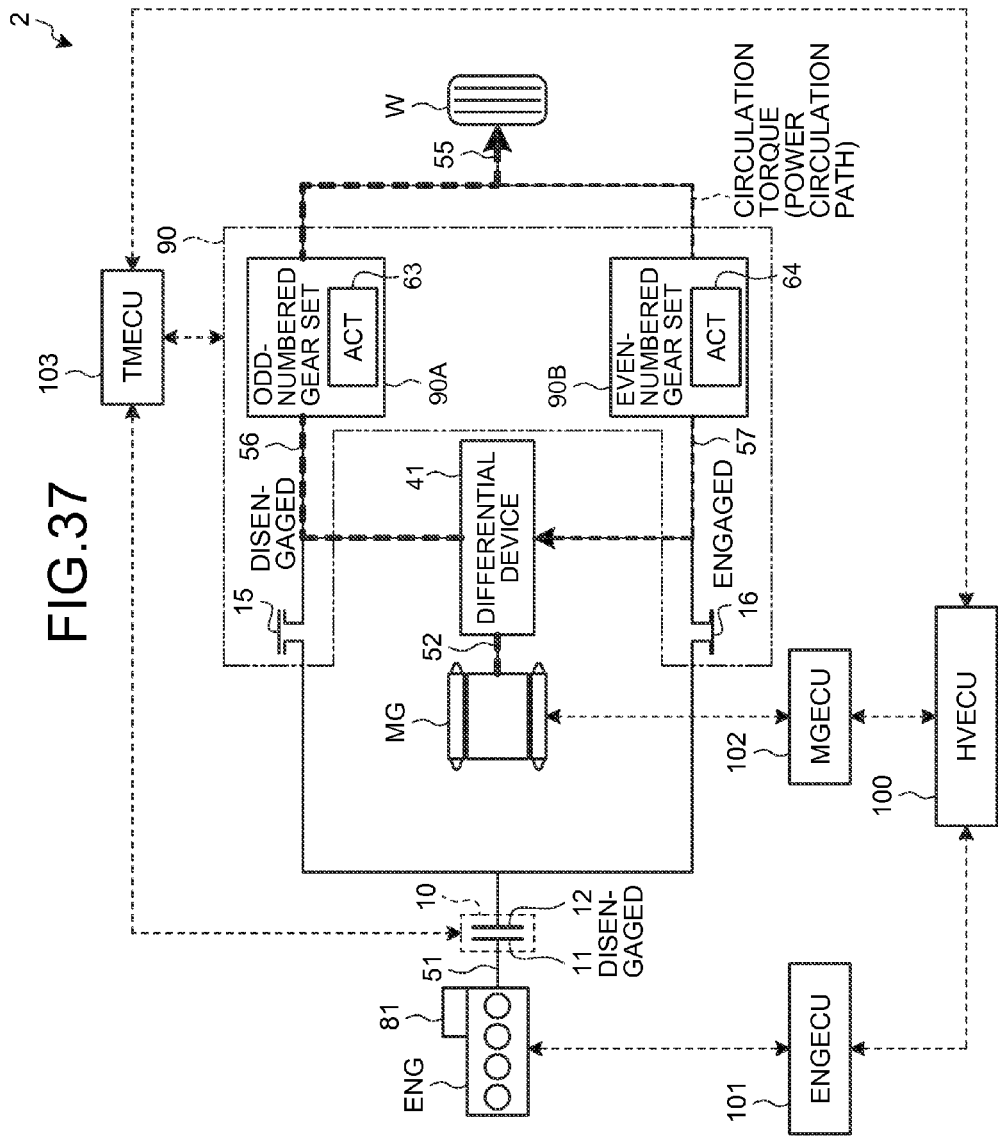
FIG. 37 is a view illustrating another power transmission path at the time of EV driving of the variation.
Figure 38:
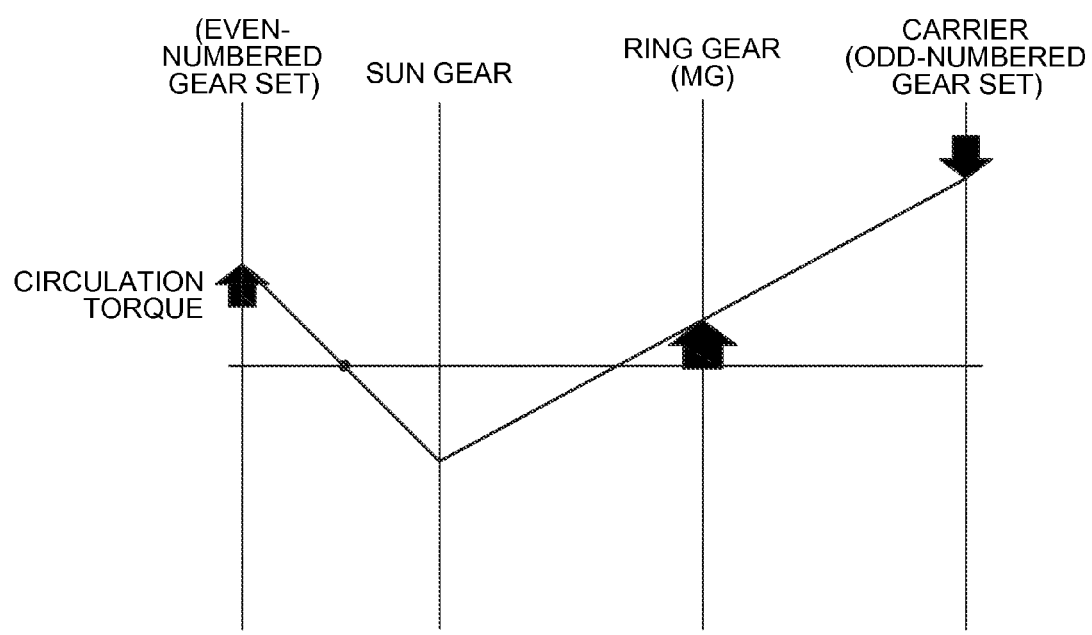
FIG. 38 is another alignment chart of the differential device at the time of the EV driving of the variation.

In the hybrid system 2 described above, the EV driving when the target gear position of the odd-numbered gear set 90A is on the higher-gear side than the target gear position of the even-numbered gear set 90B is described as an example. However, the EV driving can also be executed in an opposite case, that is to say, when the target gear position of the even-numbered gear set 90B is on the higher-gear side than the target gear position of the odd-numbered gear set 90A. Meanwhile, this may be considered while interchanging a side of the first dog clutch 15 and the odd-numbered gear set 90A and a side of the second dog clutch 16 and the even-numbered gear set 90B in the above description, and an effect similar to that of the above-described illustration can be obtained. This also applies to a case in which the engine ENG is started during the EV driving. Therefore, this is not herein described. Meanwhile, FIGS. 37 and 38 illustrate the power transmission path and an alignment chart, respectively, when the target gear position of the even-numbered gear set 90B is on the higher-gear side.

Although the odd-numbered gear set 90A and the even-numbered gear set 90B are described as the first and second transmissions, respectively, in the hybrid system 2, the even-numbered gear set 90B and the odd-numbered gear set 90A may be replaced with the first transmission and the second transmission, respectively, in the dual clutch transmission 90 of this system.

Furthermore, although the engine start during the EV driving (that is to say, switch from the EV driving mode to the engine driving mode) is described in the above-described embodiment and variation, the description in the embodiment and variation may be performed in an opposite manner when it is switched from the engine driving mode to the EV driving mode.

REFERENCE SIGNS LIST 1, 2 HYBRID SYSTEM
10 AUTOMATIC CLUTCH
11 FIRST ENGAGING UNIT
12 SECOND ENGAGING UNIT
15 FIRST DOG CLUTCH
16 SECOND DOG CLUTCH
20 FIRST TRANSMISSION
30 SECOND TRANSMISSION
40, 41 DIFFERENTIAL DEVICE
51 ENGINE ROTARY SHAFT
52 MG ROTARY SHAFT
53 ROTARY SHAFT (INPUT SHAFT)
54 ROTARY SHAFT (INPUT SHAFT)
55 ROTARY SHAFT (OUTPUT SHAFT)
56 ROTARY SHAFT (INPUT SHAFT)
57 ROTARY SHAFT (INPUT SHAFT)
81 STARTER MOTOR
90 DUAL CLUTCH TRANSMISSION
90A ODD-NUMBERED GEAR SET
90B EVEN-NUMBERED GEAR SET
100 HVECU
101 ENGINE ECU (ENGECU)
102 MGECU
103 TRANSMISSION ECU (TMECU)
ENG ENGINE
MG MOTOR/GENERATOR
W DRIVING WHEEL

The invention claimed is:

1. A hybrid system comprising:
an engine configured to rotate an engine rotary shaft connected thereto;
a motor/generator configured to rotate a motor/generator rotary shaft connected thereto;
an automatic clutch including a first side and a second side therof, and being connected to the engine rotary shaft on the first side;
a differential device including first, second, and third rotational elements, the first rotational element being connected to the motor/generator rotary shaft, the second rotational element being connected to the second side of the automatic clutch;
a first transmission mechanism including input and output shafts to transmit torque between the input and output shafts thereof and being connected to the second side of the automatic clutch and the second rotational element of the differential device via the input shaft of the first transmission mechanism, the output shaft of the first transmission mechanism being connected to wheels;
a second transmission mechanism including input and output shafts to transmit torque between the input and output shafts thereof and being connected to the third rotational element of the differential device via the input shaft of the second transmission mechanism, the output shaft of the second transmission mechanism being the same as the output shaft of the first transmission mechanism; and
a control device configured to operate the automatic clutch, set a gear ratio of the first transmission mechanism and a gear ratio of the second transmission mechanism, and control the motor/generator, wherein
during an Electric Vehicle driving mode in which only an output of the motor/generator is used for driving, the control device is configured to
set the gear ratio of the first transmission mechanism and the gear ratio of the second transmission mechanism so as to simultaneously transmit a driving torque from the differential device to the output shaft through the second transmission mechanism and a circulation torque from the output shaft to the differential device through the first transmission mechanism,
set a predetermined gear ratio to the gear ratio of the first transmission mechanism,
perform a differential operation between the rotational elements, and disengage the automatic clutch to maintain the gear ratio of the first transmission mechanism and the gear ratio of the second transmission mechanism, and
at a time the engine is to be started during the Electric Vehicle driving mode, the control device is configured to
engage the automatic clutch to increase an engine speed of the engine and
control the motor/generator to compensate for a decreased amount of the driving torque, which is decreased in connection with the engagement of the automatic clutch, by using an output torque of the motor/generator.

2. The hybrid system according to claim 1, wherein
at the time of the Electric Vehicle driving mode, the control device is configured to disengage the automatic clutch and set the gear ratios of the first transmission mechanism and the second transmission mechanism to generate a circulation torque, transmitted through the first transmission mechanism to the differential device, which is a part of a driving torque transmitted from the motor/generator through the second transmission mechanism, and,
at the time the engine is to be started, the control device is configured to engage the automatic clutch to transmit a part of the circulation torque to the engine.

3. The hybrid system according to claim 1, wherein, at the time the engine is to be started, the control device is configured to semi-engage the automatic clutch.

4. The hybrid system according to claim 1, wherein, at the time the engine is to be started, when an engine start speed is less than or equal to a rotational speed on the second side of the automatic clutch the control device is configured to engage the automatic clutch and when the engine start speed is higher than the rotational speed on the second side of the automatic clutch the engine is started by using a starter motor.

5. The hybrid system according to claim 2, wherein, at the time the engine is to be started, the control device is configured to semi-engage the automatic clutch.

6. The hybrid system according to claim 2, wherein, at the time the engine is to be started, when an engine start speed is less than or equal to a rotational speed on the second side of the the automatic clutch the control device is configured to engage the automatic clutch and when the engine start speed is higher than the rotational speed on the second side of the automatic clutch the engine is started by using a starter motor.

7. The hybrid system according to claim 3, wherein, at the time the engine is to be started, when an engine start speed is less than or equal to a rotational speed on the second side of the automatic clutch the control device is configured to engage the automatic clutch and when the engine start speed is higher than the rotational speed on the second side of the automatic clutch the engine is started by using a starter motor.

* * * * *

UNITED STATES PATENT AND TRADEMARK OFFICE
CERTIFICATE OF CORRECTION

PATENT NO. : 9,682,700 B2
APPLICATION NO. : 14/383390
DATED : June 20, 2017
INVENTOR(S) : Haruo Isomura et al.

It is certified that error appears in the above-identified patent and that said Letters Patent is hereby corrected as shown below:

At Column 18, Line 47, change from "in FIGS.10" to "in FIG.10"

At Column 22, Line 14, change from "therof, and" to "thereof, and"

At Column 24, Line 10, change from "of the the automatic" to "of the automatic"

Signed and Sealed this
Eleventh Day of September, 2018

Andrei Iancu
*Director of the United States Patent and Trademark Office*